(12) United States Patent
Roodenburg et al.

(10) Patent No.: US 7,955,028 B2
(45) Date of Patent: Jun. 7, 2011

(54) MARINE PIPELAYING SYSTEM AND METHOD FOR INSTALLING AN OFFSHORE PIPELINE THAT INCLUDES ONE OR MORE ACCESSORIES

(75) Inventors: Joop Roodenburg, Delft (NL); Anne Klaas De Groot, Sugar Land, TX (US); Diederick Bernardus Wijning, Schiedam (NL)

(73) Assignee: ITREC B V, Schiedam (NL)

( * ) Notice: Subject to any disclaimer, the term of this patent is extended or adjusted under 35 U.S.C. 154(b) by 286 days.

(21) Appl. No.: 11/883,850

(22) PCT Filed: Feb. 8, 2005

(86) PCT No.: PCT/NL2005/000093
§ 371 (c)(1),
(2), (4) Date: Jan. 9, 2008

(87) PCT Pub. No.: WO2006/085739
PCT Pub. Date: Aug. 17, 2006

(65) Prior Publication Data
US 2008/0304912 A1    Dec. 11, 2008

(51) Int. Cl.
*F16L 1/14* (2006.01)
(52) U.S. Cl. ............ 405/166; 405/158; 405/168.1; 405/168.4; 405/169; 405/170
(58) Field of Classification Search ............ 405/154.1, 405/158, 166, 168.1, 168.2, 168.3, 168.4, 405/169, 170; 166/85.1
See application file for complete search history.

(56) References Cited

U.S. PATENT DOCUMENTS
5,348,423 A  9/1994 Maloberti et al.
(Continued)

FOREIGN PATENT DOCUMENTS
WO    WO 96/018839 A1    6/1996
(Continued)

OTHER PUBLICATIONS
Drilling Vessel "Deep Blue", built 2001, http://www.ship-technology.com/projects/deep_blue, pp. 1-3 and http://www.shipspotting.com/modules/myalbum/photo.
(Continued)

*Primary Examiner* — David J Bagnell
*Assistant Examiner* — Benjamin Fiorello
(74) *Attorney, Agent, or Firm* — Birch, Stewart, Kolasch & Birch, LLP

(57) ABSTRACT

Marine pipelaying method and system for installing an offshore pipeline (1) that includes one or more accessories (10). The method includes the steps of providing a vessel (2), launching the pipeline (1) in a firing line from the vessel (2) in the direction of the seabed, engaging the pipeline (1) with a clamping device (5b) that is connected to the vessel (2) and adapted to support the weight of the previously launched pipeline (1), and moving the accessory (10) into the firing line to a position above the clamping device (5b). Then the accessory (10) is connected to the pipeline (1) above the clamping (5b) device while the pipeline (1) is held by the clamping device (5b) Follow that the accessory (10) and the launched pipeline (1) connected thereto and releasably secured to a controlled load hoisting device (5) and the weight of the accessory (10) and the launched pipeline (1) connected thereto are transferred from the clamping device (5b) to the controlled load hoisting device (5) while the accessory (10) and the launched pipeline (1) connected thereto remain in the firing line. Finally the clamping device (5b) is disengaged from the pipeline (1) and moved away from firing line. Then the accessory (10) and the launched pipeline (1) connected thereto are lowered along the firing line by the controlled load hoisting device (5).

22 Claims, 22 Drawing Sheets

U.S. PATENT DOCUMENTS

| | | |
|---|---|---|
| 6,056,478 A | 5/2000 | Martin et al. |
| 6,352,388 B1 | 3/2002 | Seguin et al. |
| 6,361,250 B1 * | 3/2002 | de Varax .................. 405/158 |
| 6,796,742 B1 | 9/2004 | Roger et al. |
| 2002/0021943 A1 * | 2/2002 | Frijns ..................... 405/170 |
| 2002/0159839 A1 | 10/2002 | Frijns et al. |
| 2003/0091395 A1 * | 5/2003 | Stockstill ................ 405/154.1 |
| 2003/0147699 A1 | 8/2003 | Long et al. |
| 2003/0219313 A1 | 11/2003 | Giovannini et al. |
| 2003/0231931 A1 | 12/2003 | Moszkowski et al. |

FOREIGN PATENT DOCUMENTS

| | | |
|---|---|---|
| WO | WO-03/067019 A2 | 8/2003 |
| WO | WO 03/087652 A2 | 10/2003 |
| WO | WO 2004/068012 A2 | 8/2004 |
| WO | WO-2004/085898 A | 10/2004 |
| WO | WO 2006/054891 A1 | 5/2006 |

OTHER PUBLICATIONS

International Search Report dated for Jul. 6, 2006 in International Application No. PCT/EP2006/001781.

Office Action dated Apr. 29, 2010 in U.S. Appl. No. 11/884,946.

Third Party Observation Art 115 EPC for European Patent Application 08702030.1 filed Apr. 2, 2008 (12 pages).

* cited by examiner

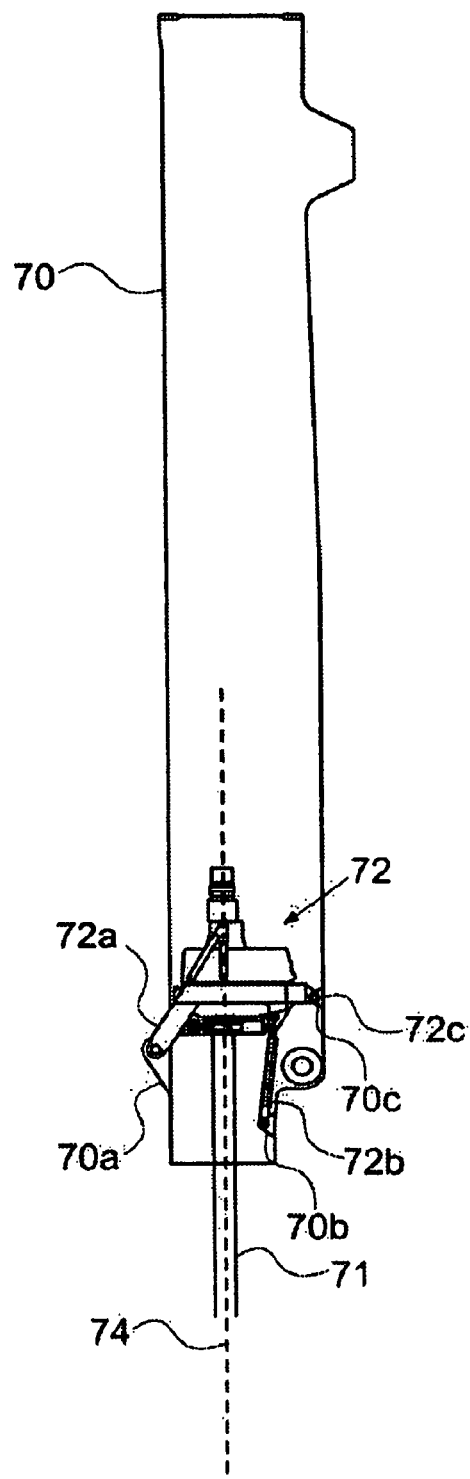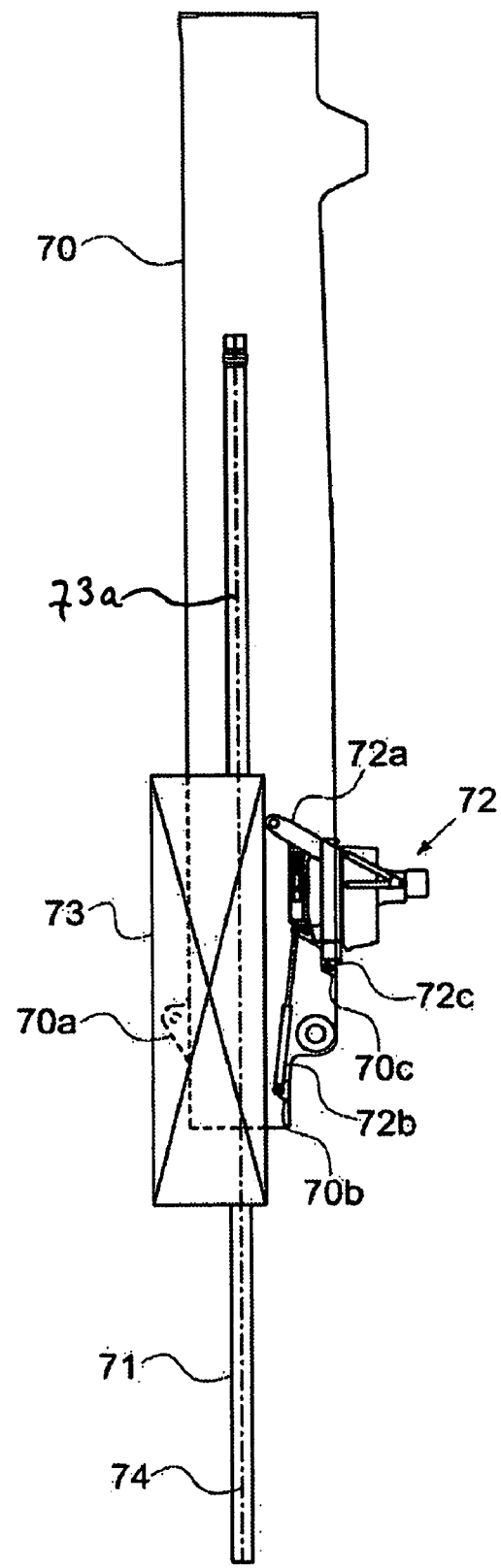
FIG 5a
FIG 5b

MARINE PIPELAYING SYSTEM AND METHOD FOR INSTALLING AN OFFSHORE PIPELINE THAT INCLUDES ONE OR MORE ACCESSORIES

FIELD OF THE INVENTION

The present invention relates to the underwater laying of offshore pipelines. More specifically, the subject of the invention relates to a marine pipelaying system and method for installing an offshore pipeline that includes one or more accessories.

BACKGROUND OF THE INVENTION

Subsea pipelines have most often been laid on the ocean floor by connection or welding on the deck of a barge, lowering off the back of barge, and then laying on the ocean floor. The offshore pipeline industry uses various concepts of pipelaying.

A commonly known technique is referred to as the S-lay technique. In the S-lay technique, pipe sections are added to the previously launched pipeline in an assembly line, commonly including one or more welding station, which assembly line is arranged in a horizontal or near horizontal position on a pipelaying vessel, such as a lay barge. The pipeline then curves over the stern of the barge with the aid of a ramp or stinger, angles down toward the seabed, and curves back to horizontal and lays on the seabed. The launching of the pipeline is controlled by one or more pipeline tensioners, commonly positioned at the end of the assembly line and upstream of the stinger. These tensioners are capable of holding the previously launched pipeline. The profile of the pipeline from the pipelaying vessel to the seabed is in the form of a long "S". The S-lay technique is mostly used in combination with relatively shallow water depths.

Alternatively, a vertical or near vertical laying techniques have been developed, primarily for deepwater offshore pipelaying, in particular the J-lay technique. J-lay pipelaying is conducted from a vessel having a tower mounted on the vessel. In a known arrangement individual pipe sections are loaded into the tower with a pipe loader and then positioned above the upper end of the previously launched pipeline. A welding station is commonly present to perform welding operations in order to connect a pipe section (or a subassembly of pipe sections) to the previously launched pipeline. In the tower, commonly below the welding station, a clamp is provided for holding and supporting the weight of the previously launched pipeline. After welding the pipeline and its newly-added pipe section(s) are lowered through this clamp and then clamp is again engaged with the pipeline near the upper end thereof. These steps are repeated as the vessel moves forward to thereby effect laying of the pipeline on the bottom of the sea. The launched pipeline follows a trajectory which has shape of a "J", which "J" will not normally be vertical at the top, but rather has an angle with a horizontal component to be able to control the bending forces in the pipeline as it is touching the seabed.

It is also known to employ a "pipe storage reel" or "reel laying" method for laying an offshore pipeline. In this method the pipeline to be laid is manufactured in a continuous length on board of the pipelaying vessel or at a shore facility and then spooled onto a large spool. During the pipelaying process the pipeline is commonly straightened and passed over an (inclined) ramp or a tower. Tensioners and/or clamps are used for holding the previously launched pipeline. This method is mostly used with pipelines of limited diameter.

In most offshore pipelines to be laid on the seabed there is a need to install modules (accessories) on the ends of the pipeline and/or at one or multiple spaced intermediate locations along the pipeline. These modules are usually quite large and heavy and are commonly designed to be welded onto the pipeline. Examples of such modules are initiation fittings, pipeline end terminations (PLET), branches, inline SLED assemblies, inline manifolds, pipe valves, tee assemblies with their supporting structures and mud-mats.

Such pipeline accessories should often be welded inline with the pipeline. Often the accessory has pipeline connection parts at opposed ends thereof to connect the pipeline to those pipeline connection parts. It is however also known to have a pipeline accessory which is to be mounted, mostly by welding or using bolts, externally on the pipeline.

Various prior art solutions are known to mount an accessory at the end of a pipeline or at an intermediate location in a pipeline.

In WO 03/067019, a system for introducing an inline accessory into a pipeline is described. The system comprises a reel, a tensioner and a clamp, usually referred to as "hang-off" clamp. The clamp is adapted to support the weight of the launched pipeline which is suspended from said clamp. Furthermore, this known system comprises a ramp, here having variable inclination, with a pipeline feeding position and an accessory connection position, arranged next to one another. The area in between the tensioner and the clamp can be used to install accessories into the pipeline. The clamp is capable of translating horizontally—while the launched pipeline is suspended therefrom—from the pipeline feeding position to the accessory connection position. Means are provided for lowering the pipeline and accessory connected thereto past the clamp.

In US 2002/0159839 a pipelaying method and apparatus are described for near vertical laying of an offshore pipeline. The apparatus includes a tower and a hang-off clamp for suspending the launched pipeline. It is described that after the accessory has been welded to the pipeline in the tower, the clamp with the launched pipeline still suspended from the clamp and the accessory welded on top of the pipeline is moved generally horizontally to a position out of the tower. The accessory and launched pipeline are then connected to a hoisting cable of a crane mounted on the vessel. The weight of the launched pipeline and accessory is then transferred to the crane, whereafter the clamp is released from the pipeline. Hereafter, the clamp is displaced back in the tower and the crane then lowers the accessory and the launched pipeline connected thereto over predetermined height, essentially to below the tower. With the aid of the crane and the hoisting cable the accessory and the launched pipeline connected thereto are then returned to their original position in the tower where the clamp can engage the pipeline again above the accessory.

These known techniques for inserting an accessory into or at the end of a pipeline while laying an offshore pipeline are unsatisfactory.

SUMMARY OF THE INVENTION

The object of this invention is to provide an improved technique and associated system for laying an offshore pipeline and including one or more pipeline accessories into and/or at the end of the pipeline.

This object is achieved by a method for installing an offshore pipeline that includes one or more accessories according to the invention, which method comprises the steps of:

providing a vessel launching the pipeline in a firing line from the vessel in the direction of the seabed engaging the pipeline with a clamping device that is connected to the vessel and adapted to support the weight of the previously launched pipeline, moving an accessory into the firing line to a position above the clamping device, connecting the accessory to the pipeline above the clamping device while the pipeline is held by the clamping device, releasably securing the accessory and the launched pipeline connected thereto to a controlled load hoisting device, transferring the weight of the accessory and the launched pipeline connected thereto from the clamping device to the controlled load hoisting device while the accessory and the launched pipeline connected thereto remain in the firing line, removing the clamping device from the pipeline, moving the clamping device out of the firing line, p1 lowering the accessory and the launched pipeline connected thereto along the firing line by the controlled load hoisting device.

Using this method, the launched pipeline is maintained in its firing line and is not moved sideways as in prior art methods. This is essentially accomplished by moving the clamping device away from the firing line, so that the accessory can pass by the clamping device as the pipeline and accessory connected thereto are lowered along said firing line. With the firing line, the intended trajectory of the pipeline from the vessel to the seabed is meant.

Compared to prior art techniques an advantage is that no undesirable tensions are introduced into the launched pipeline during these procedures.

The object is also achieved by a system according to the invention, which system comprises:

a vessel a pipeline launch device for launching the pipeline in a firing line from the vessel in the direction of the seabed a clamping device that is connected directly or indirectly to the vessel and adapted to support the weight of the previously launched pipeline, which clamping device can engage the pipeline, accessory displacement means for moving the accessory into the firing line to a position above the clamping device, accessory connecting means for connecting the accessory to the pipeline while the pipeline is in the clamping device, a controlled load hoisting device that can releasably be secured to the accessory and the launched pipeline connected thereto and can lower the accessory and the launched pipeline connected thereto.

As will be shown in more detail the inventive technique can be employed in combination will all sorts of offshore pipelaying techniques, such as J-lay, Reel lay and S-Lay.

As a floating vessel for instance any type of laybarge can be used, whether appropriate for J-lay, S-lay or reel-lay pipelaying. Preferably, the vessel is a dynamically positioned vessel, capable of moving during pipe laying process. The vessel moves forward as the pipeline is laid on the seabed.

The clamping device which is adapted to hold and support the weight of the launched pipeline is embodied such that the clamping device is moveable out of the firing line, so that said clamping device or parts thereof are brought to a remote or inactive position, which allows for the lowering of the pipeline and the accessory. The accessory can then pass by said moved away clamping device.

It can be envisaged that the entire clamping device is displaced to said remote or inactive position. It can also be envisaged that only moveable parts of the clamp which engage of the pipeline are moved to a remote position, whereas a base structure of the clamp remains stationary. Clamping devices wherein both the base structure of the clamp is moveable as well as moveable pipeline engaging clamp parts are of course also possible.

For instance the inactive position of the clamping device or parts thereof is such that an effective opening for the passage of an accessory is provided having dimensions of at least 1×1 meter, preferably at least 1.5×1.5 meter, more preferably at least 1.5×3 meter.

The clamping device can be all sorts of designs. The design could be based on existing clamp designs for supporting the weight of the previously launched pipeline, which clamps are now to be made moveable as mentioned above. It could be of the type engaging beneath a formation, such as a collar or end fitting, on the pipeline as is known in J-lay. It could also be of the type engaging on the pipeline with friction. The friction surfaces of the clamp can be of stationary design, but it could also be of a movable design, commonly referred to as a tensioner having continuous belts with friction pads, engaging on the pipeline.

The controlled load hoisting device used for lowering the pipeline and the accessory connected thereto in the firing line from the vessel in the direction of the seabed can have various embodiments, examples of which will be discussed in more detail below. For example, use can be made of existing controlled load hoisting devices now commonly included in systems for J-lay, S-lay and reel-lay as will be shown below.

A vertical or near vertical pipeline laying system, in particular a J-lay system, generally comprises a tower, mounted on the vessel. The tower can have a fixed orientation, but it is also known to provide a tower with variable inclination, for instance about one horizontal axis or even about two perpendicular horizontal axes. It is even possible to have a (free) gimballing tower.

The tower has an elongated structure which extends in the direction of the firing line, in particular in the direction of the upper end of the firing line. The firing line can extend through the structure of the tower, but it is also possible that the tower structure is essentially adjacent and parallel to the firing line.

A J-lay system generally comprises a hang-off clamp for holding and supporting the weight of the previously launched pipeline that extends downwardly towards the seabed. The hang-off clamp is connected to the vessel, either directly or via the tower structure, and engages the pipeline. Commonly the hang-off clamp is arranged in the lower part of the tower. Preferably, the clamping device can be actuated hydraulically. A stinger can be provided at the lower end of the tower, e.g. extending to below the water surface. Such a stinger is commonly provided for guiding the pipeline.

Generally, pipe sections are loaded one by one in the tower and fastened to the upper end of the launched pipeline by welding or through other (mechanical) connection arrangements.

In general, a S-lay system comprises a horizontal welding station(s) section to which pipe sections are supplied, in order to form a pipeline that can be launched. Furthermore, a S-lay system preferably comprises one or more tensioners and a stinger. The tensioners hold the pipeline and support the weight of the previously launched pipeline which passes along the stinger towards the seabed.

A reel-lay system comprises a ramp or a tower, to which a hang-off clamp and possibly one or more tensioners are connected. Generally, a continuous, possibly previously welded, pipeline is provided on the reel.

When using a J-lay or S-lay technique the launched pipeline can be made to have an upper end above the hang-off clamp or upstream of the last tensioner. The accessory can then be brought into the firing line and fitted to said upper end, while the pipeline is suspended from said hang-off clamp of last tensioner. Then the weight is transferred to the controlled load hoisting device and the clamp, tensioner, or relevant parts thereof, are moved out of the way in order to allow for the passage of the accessory.

It can also be envisaged that the accessory is not fitted and serve as an intermediate or end part of the pipeline itself, but that the accessory is only externally fitted onto the pipeline. For example a mud-mat is provided externally on a particular location of the pipeline. The technique according to the invention is also advantageous for these situations. This situation can easily be envisaged in reel-lay systems, where the pipeline to be launched is essentially continuous. However, in J-lay and S-lay techniques, the pipeline can also be extending above or upstream of the hang-off clamp or last tensioner, e.g. as new pipe sections have already been welded to the launched pipeline. After engaging the pipeline, it is possible to move an accessory into the firing line to a position above or upstream of the clamping device, according to the invention, which accessory is then connected to the pipeline essentially without interrupting the pipeline.

Alternatively an embodiment of the inventive technique can be envisaged, wherein the position above the clamping device is cleared by interrupting the pipeline, e.g. in the reel lay technique. The clamping mechanism can be used to engage the pipeline and hold it so that the pipeline can be cut above the clamping device, severing it into two sections. This enables the clamp to hold the lower section of the pipeline (i.e. the section below the cut and between the vessel and seabed) while an accessory can be added to the pipeline.

The accessory is preferably moved into the firing line to a position above the clamping device by accessory displacement means. The accessory displacement means can for example be a crane, e.g. a deck mounted crane of the vessel or a crane mounted in the pipe launch device, e.g. in the tower. Alternatively, the displacement means comprise a rail mounted carrier for the accessory, e.g. to translate the accessory approximately horizontally between a storage position and the firing line.

In cases where the firing line is located in a tower structure it can be envisaged that an accessory is introduced into the tower structure, e.g. sideways, to connect the accessory to the pipeline within the tower. Another option, e.g. for large accessories, will be to move, in particular pivot, the tower away from the firing line, while the clamp with the launched pipeline held thereby remain essentially stationary, so that the pipeline maintain its position in the firing line. With the tower moved out of the firing line, it is possible to introduce the large accessory in the firing line for example by a crane, which lowers the accessory from above onto the upper end of the pipeline which is now no longer "covered" by the tower structure.

In the above example, as well as in other embodiments, moving the clamping device to its inactive or remote position might no be sufficient to allow for the supply of the accessory to its connecting position and/or the lowering of the pipeline with the accessory fitted thereon. It might be necessary to remove other elements of the pipelaying system from the firing line, such as welding stations, NDT stations, coating stations, line-up tools, working stations, etc.

Preferably, the accessory is connected to the pipeline by welding. Alternatively, mechanical connecting means, e.g. screw thread connections, can be used.

In the inventive technique the accessory and the launched pipeline connected thereto are releasably secured to a controlled load hoisting device. The controlled load hoisting device comprises a lowering mechanism to lower the accessory and the launched pipeline connected thereto.

Laybarges are commonly provided with an abandonment and recovery line (A&R) system for the pipeline, comprising an A&R winch and an A&R cable. This system can be uses as a controlled load hoisting device. Alternatively, a crane, mounted on the vessel, e.g. on the deck or in the tower or ramp, can be used as a controlled hoisting device. Possibly the same crane acting as accessory displacement means can also act as a load hoisting device.

In systems provided with a tower, this tower can be provided with a pipeline hoist cable suspended from the tower. This pipeline hoist cable can be releasably secured to the accessory and act as a controlled load hoisting device according to the invention.

In particular reel-lay and S-lay systems can be provided with a pipe tensioner, positioned in the firing line above the clamping device, seen in the direction of pipeline supply, and above the intended place for mounting the accessory to the pipeline. This tensioner can also act as a controlled load hoisting device. In this embodiment the clamping device can also be designed in the manner of a tensioner.

With the accessory connected to the launched pipeline and the controlled load hoisting device secured to it, the weight of the accessory and the launched pipeline connected thereto is transferred from the clamping device to the controlled load hoisting device. Hereafter the clamping device is disengaged from the pipeline and moved out of the firing line. Preferably, the clamping device is designed to provide an opening for the sideways removal from the pipeline and is then removed from the pipeline. In a preferred embodiment, the clamping means are removed from the pipeline essentially perpendicular to the firing line. In an alternative preferred embodiment, the clamping device translates horizontally between the firing line and a remote position, for example across a rail. Alternatively, the clamping means are rotated away from the firing line.

Subsequently, the controlled load hoisting device lowers the accessory and the launched pipeline connected thereto along the firing line.

When an abandonment and recovery system is used as a controlled load hoisting device, the A&R cable is long enough to lower the accessory and the launched pipeline to the seabed. This is for example advantageous when the accessory is a pipe line end termination (PLET).

If continuation of the pipeline is desired after the introduction of the accessory, the upper part of the accessory can preferably be engaged by the clamping device. In that case the controlled hoisting device lowers the accessory and the launched pipeline connected thereto until the upper part of the accessory can be engaged by the clamping device, after which the clamping device is moved back into the firing line and clamps the upper part of the accessory. The weight of the accessory and the launched pipeline can be transferred back to the clamping device while the accessory and the launched pipeline connected thereto remain in the firing line. Hereafter, the controlled load hoisting device can be disconnected from the upper part of the accessory.

Alternatively, the upper part of the accessory cannot by engaged by the clamping device. In that case, a pipe section will be connected to the accessory before lowering. This pipe section can be provided before the introduction of the accessory in the firing line or alternatively the pipe section is connected to the accessory while the accessory is in the firing line. It is also possible to provide collars with the pipeline. In that case, the clamping means engages the collar connected to the pipeline.

BRIEF DESCRIPTION OF THE DRAWINGS

The present invention will be explained in greater detail with reference to the figures, in which:

FIGS. 5a and 5b show an example of a clamping device, removable from the firing line.

DETAILED DESCRIPTION OF THE DRAWINGS

Figure 1A:
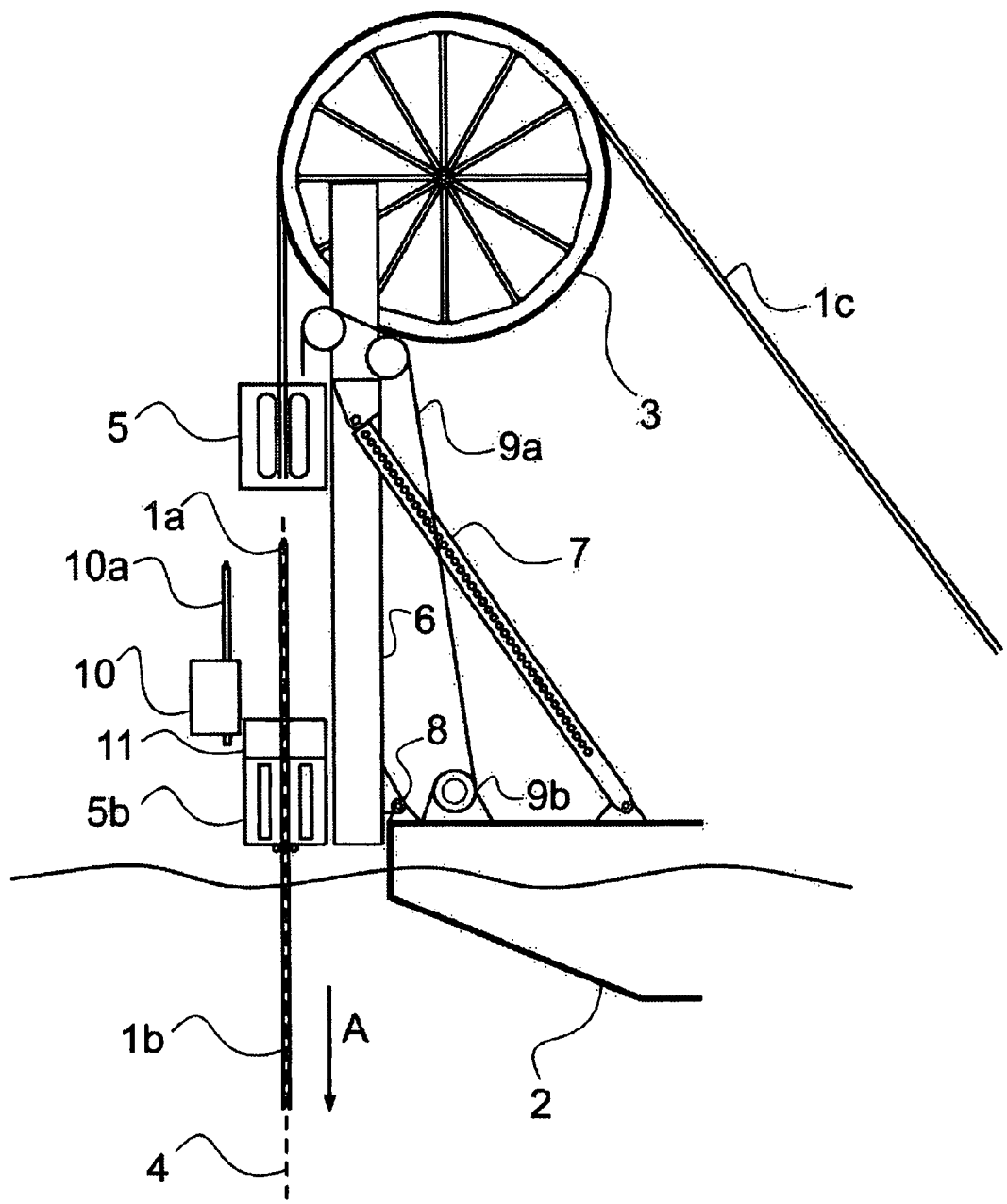
FIGS. 1a-1h show a reel-lay pipeline installation in which an accessory is introduced with the aid of an abandonment and recovery cable by a method according to the invention.

FIGS. 1a-g show schematically a preferred marine pipelaying method for installing an offshore pipeline that includes an accessory according the invention.

In FIGS. 1a-g a stern of a floating vessel 2 is shown. The vessel 2 is provided with a tower 6, which tower 6 is connected pivotally to the vessel 2 by hinge part 8, defining an essentially horizontal pivot axis. The inclination of the tower 6 is adjustable and can be maintained by connecting arm 7.

Near the top of the tower 6 a pipeline guide wheel 3 or other guide structure is mounted, which serves to guide the pipeline from a storage reel (not shown here) to the firing line 4 extending along the tower 6. Reference numeral 1c denotes the pipeline part coming from the storage reel and passing over the guide wheel 3.

The during normal pipelaying continuous pipeline extends from said guide wheel 3 in said firing line 4 in the direction A to the seabed (not shown). The launched pipeline is denoted with 1b in the figures.

On the tower 6 a tensioner 5 is provided downstream of the guide wheel 3. It can be envisaged that a pipeline straightener and possibly a pipeline centralizer are mounted between said guide wheel 3 and the tensioner 5.

In this embodiment a hang-off clamp 5b is mounted at the lower end of the tower 6. It could be envisaged that said hang-off clamp 5b is supported directly from the hull of the vessel. This hang-off clamp 5b is adapted to support the weight of the previously launched pipeline 1b.

A welding station 11 is positioned above the hang-off clamp 5b and also connected to the tower 6. One or more abandonment and recovery (A&R) winches 9b are mounted on the tower or (as in this example) on the vessel 2. An A&R cable 9a can be actuated by the winches 9b and extends over one or more pulleys which position the A&R cable end essentially in the firing line 4 well above the hang-off clamp 5b. Alternatively the A&R winches can be connected to tower 6.

In FIG. 1a the pipeline which has been launched from the reel, is shown to be interrupted, so that the launched pipeline 1b now has an upper end 1a. This end 1a is located in the firing line 4.

Also in FIG. 1a an accessory 10 is schematically depicted, which is now out of the firing line 4. In this example the accessory 10 has at its upper end an tubular extension 10a, here of dimensions essentially conforming to the dimensions of the pipeline.

Figure 1B:
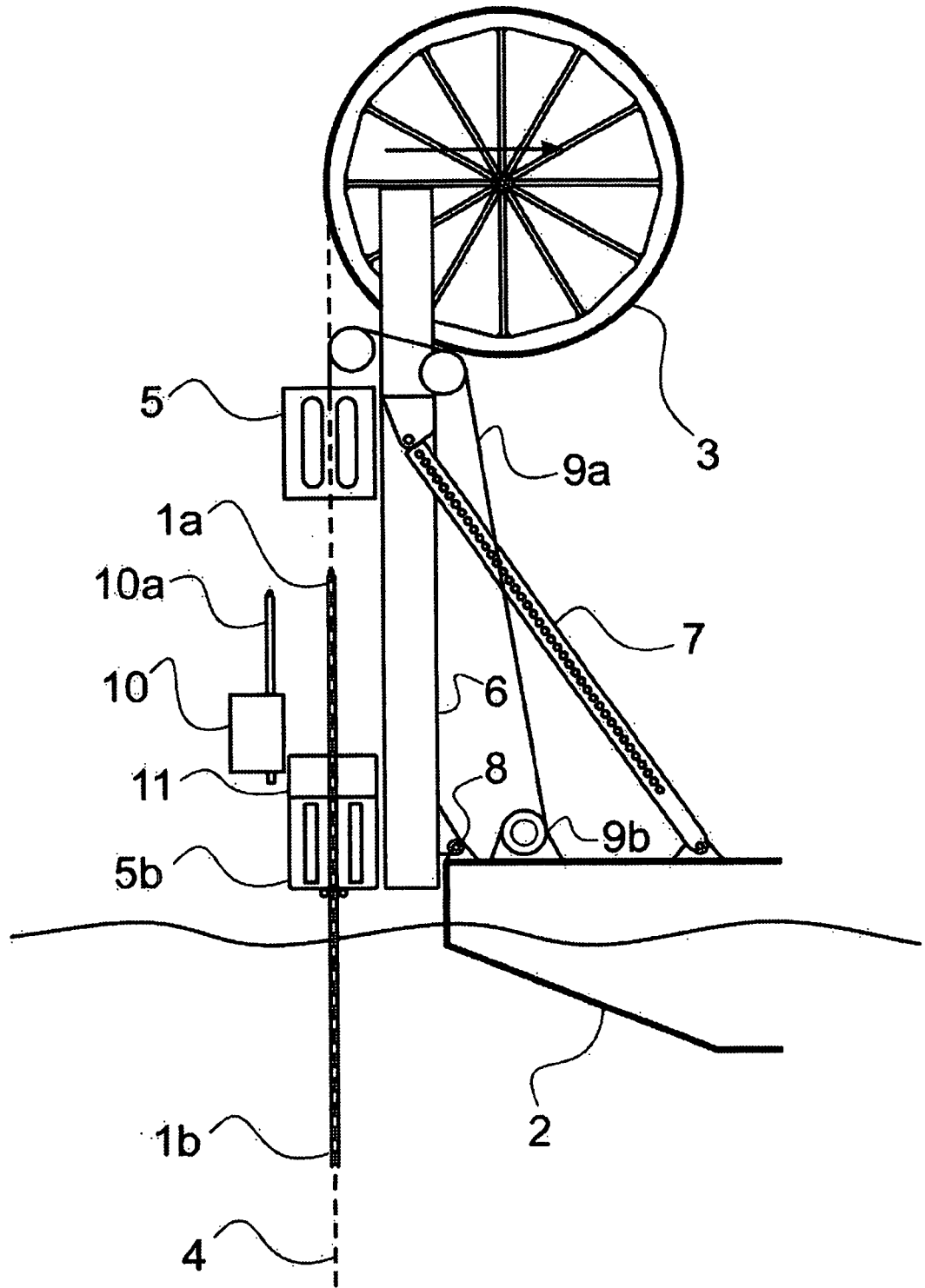
Figure 1C:
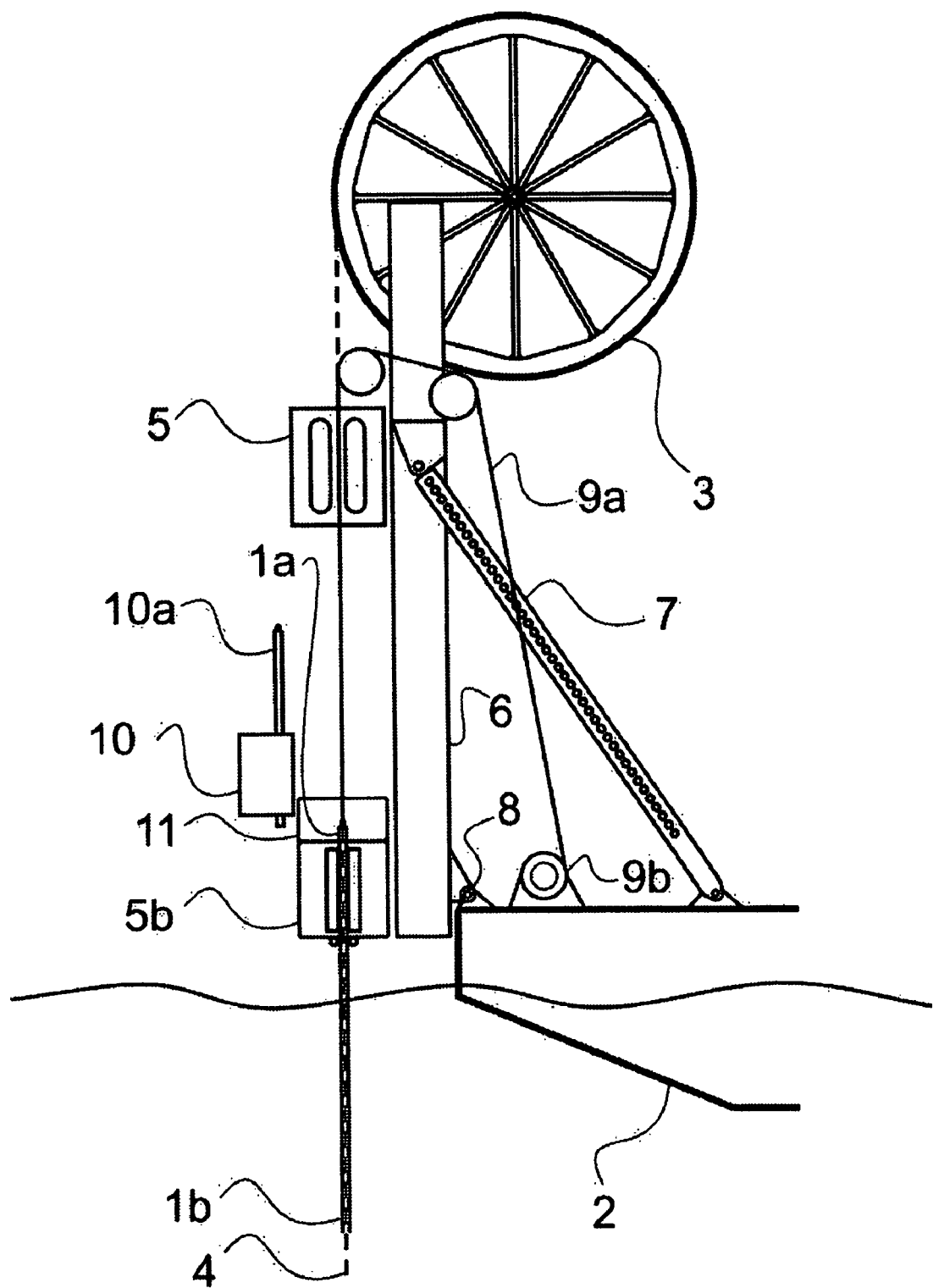

In FIG. 1b the abandonment and recovery cable 9a is connected to this upper pipe end 1a, which cable 9a is capable of lowering the pipeline 1 until the upper pipe end 1a is located just above the hang-off clamp 5b as is depicted in FIG. 1c. Subsequently, the abandonment and recovery cable 9a is removed from the upper pipe end 1a and the accessory 10 introduced into the firing line 4, just above the hang-off clamp 5b.

Figure 1D:
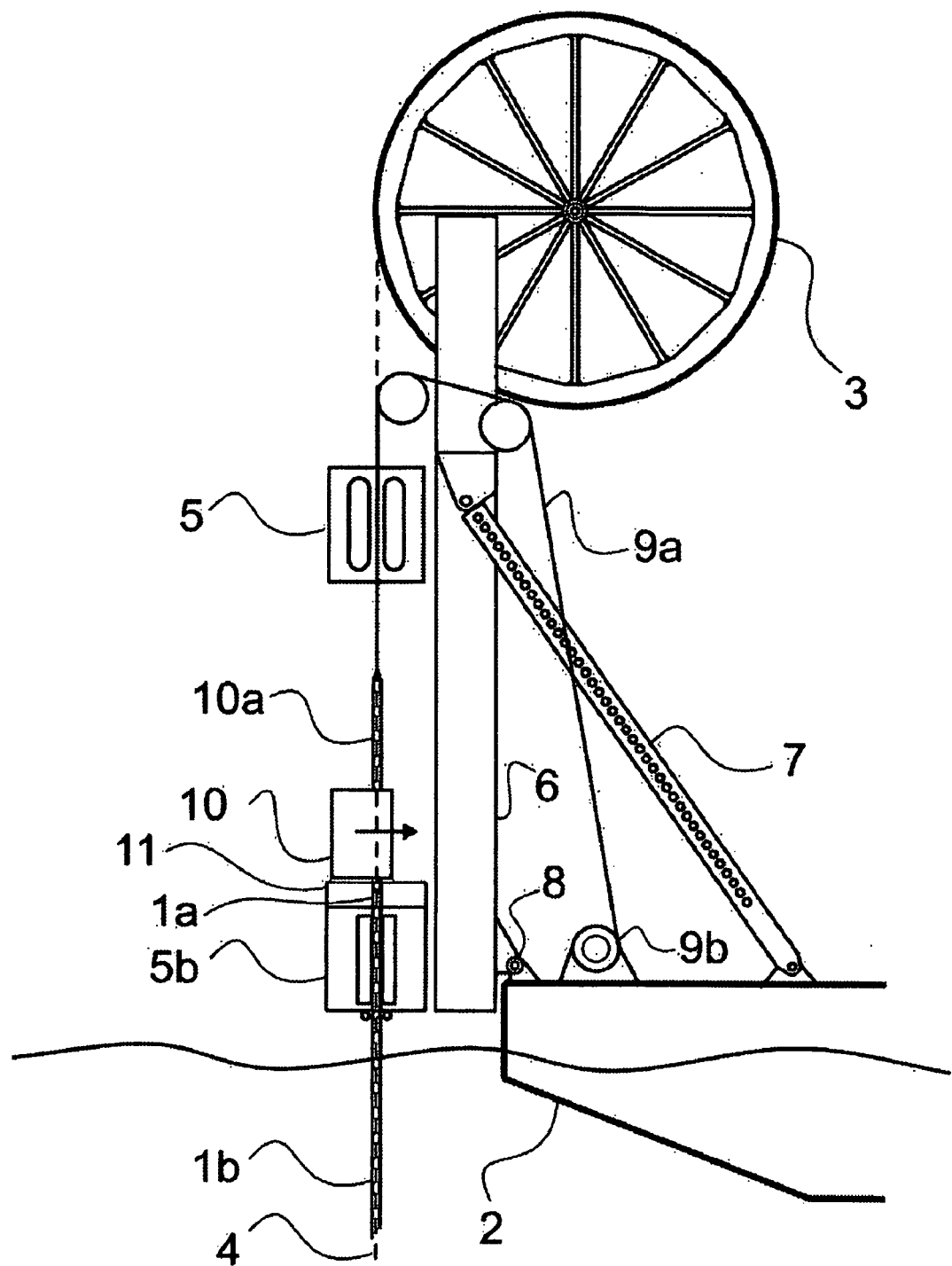

Alternatively the pipeline is severed directly just above the hang-off clamp 5b to obtain the situation of FIG. 1d.

It might be an option that the pipeline 1c is removed from the tower 6 and wheel 3 and/or tensioner 5 removed from the firing line 4 to provide a passageway for cable 9a.

The accessory 10 is welded to the upper pipe end 1a in the welding station 11. The hang-off clamp 5b now supports the launched pipeline 1b.

The abandonment and recovery cable 9a is releasably secured to the upper end 10a of the accessory 10. This situation is depicted in FIG. 1d. Then the weight of the accessory 10 and the launched pipeline 1b connected thereto is transferred from the hang-off clamp 5b to the A&R cable 9a, while the accessory 10 and the launched pipeline 1b connected thereto remain in the firing line 4.

Figure 1E:
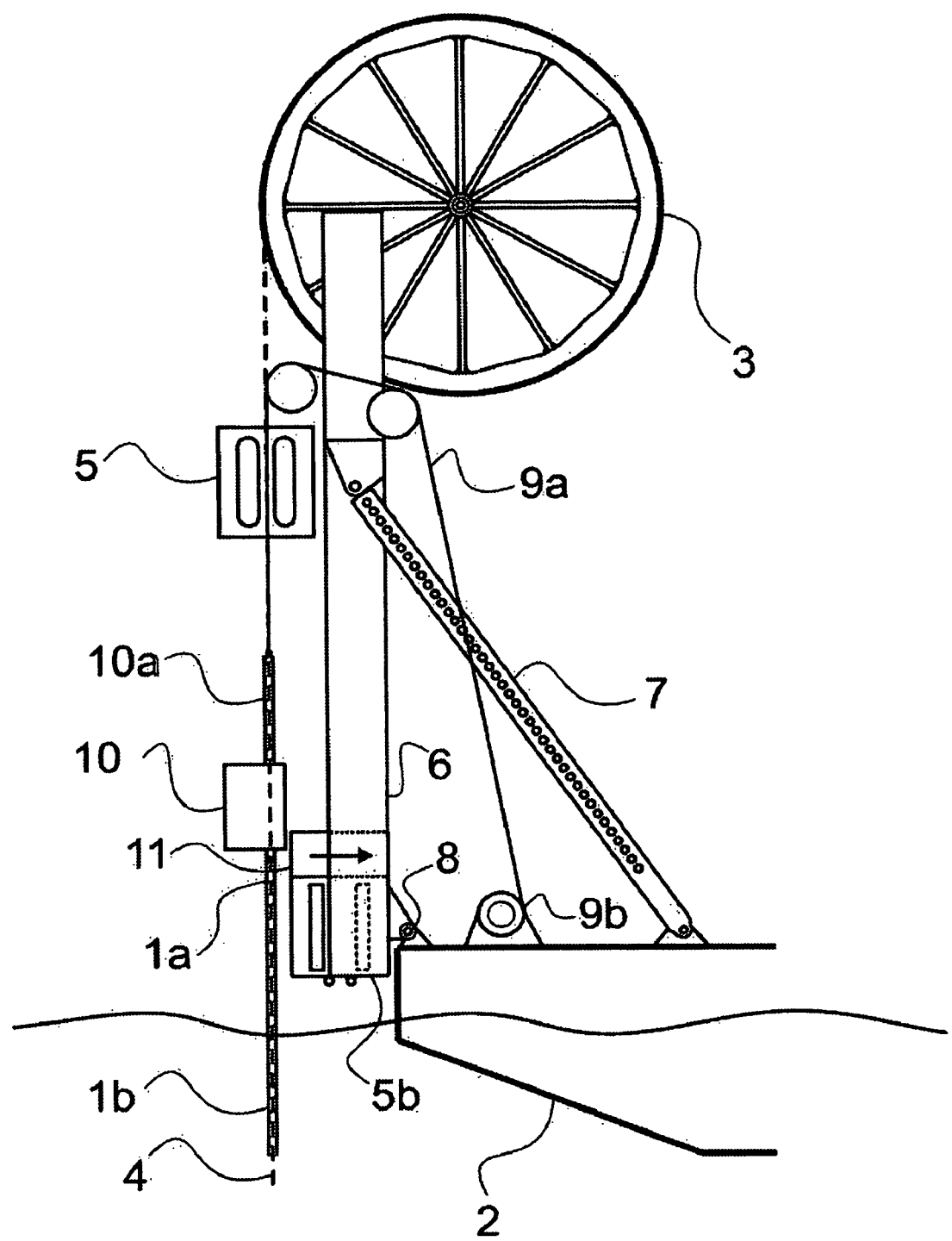

In FIG. 1e the next step is shown: the hang-off clamp 5b is disengaged from the pipeline 1 and removed from the firing line 4, here together with the welding station 11. In this embodiment the clamp 5b and the welding station 11 are moved into the tower 6. As this motion of the clamp 5b takes place the clamp is not loaded by the weight of the pipeline 1b, which allows for an fairly simplex construction of the clamp displacement means. These could include one or more rails upon which a carrier supporting the clamp 5 is moveable, e.g. by skidding or by rollers on the carrier. Other arrangements are also possible.

Figure 1F:
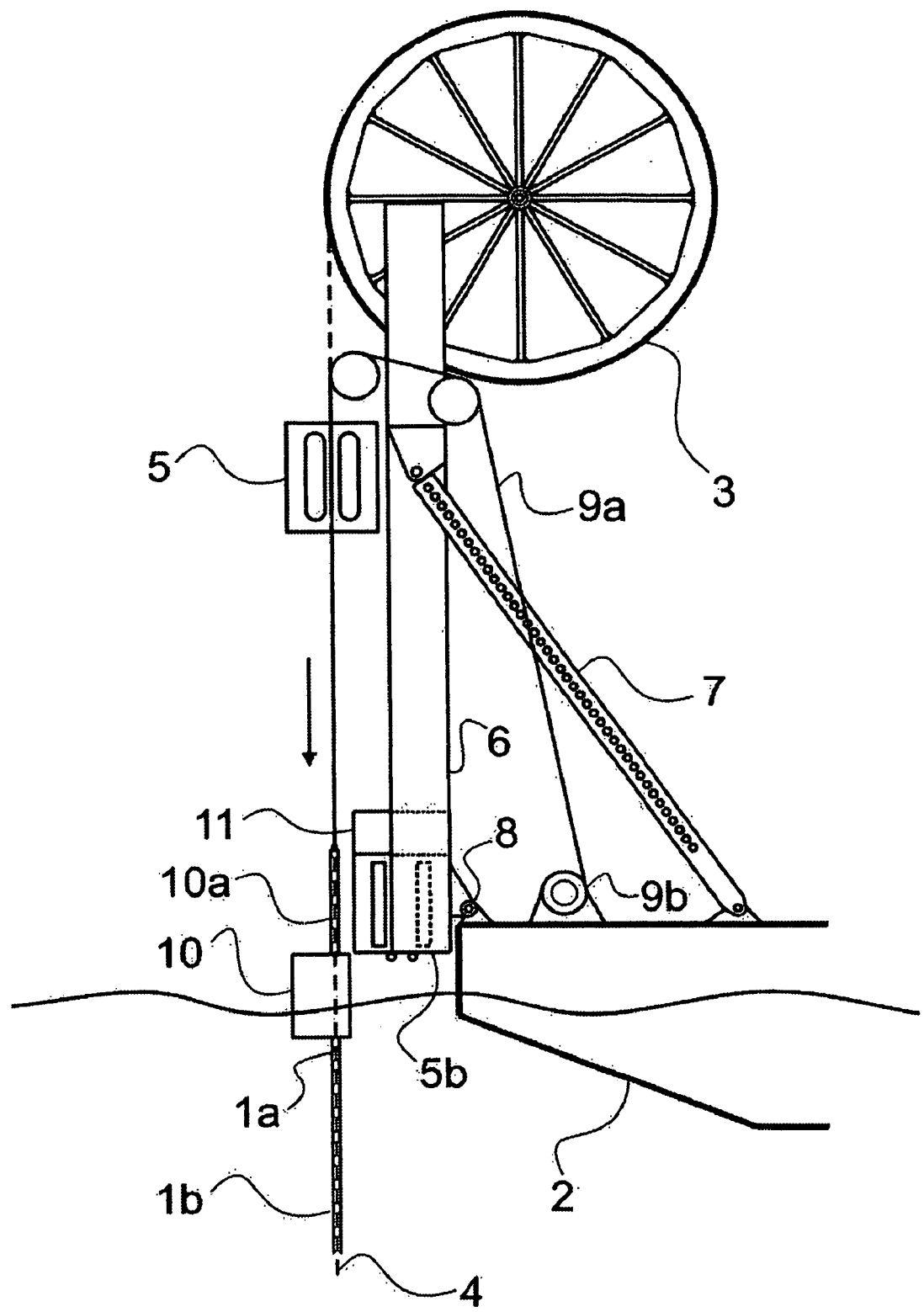

In FIG. 1f it is shown that the A&C cable 9a has lowered the accessory 10 and the launched pipeline 1b connected thereto along the firing line 4. The accessory 10 and the launched pipeline 1b connected thereto are lowered until the upper end 10a of the accessory is at the level of the hang-off clamp 5b, when the hang-off clamp 5b would be in the firing line 4. In fact, the upper pipe end 1a is now also part of the launched pipeline. However, for reasons of clarity, this part of the pipeline 1 will continue to be indicated with the number 1a. It would also be possible for the A&R cable 9a to lower the accessory 10 and the launched pipeline 1b connected thereto to the seabed.

Figure 1G:
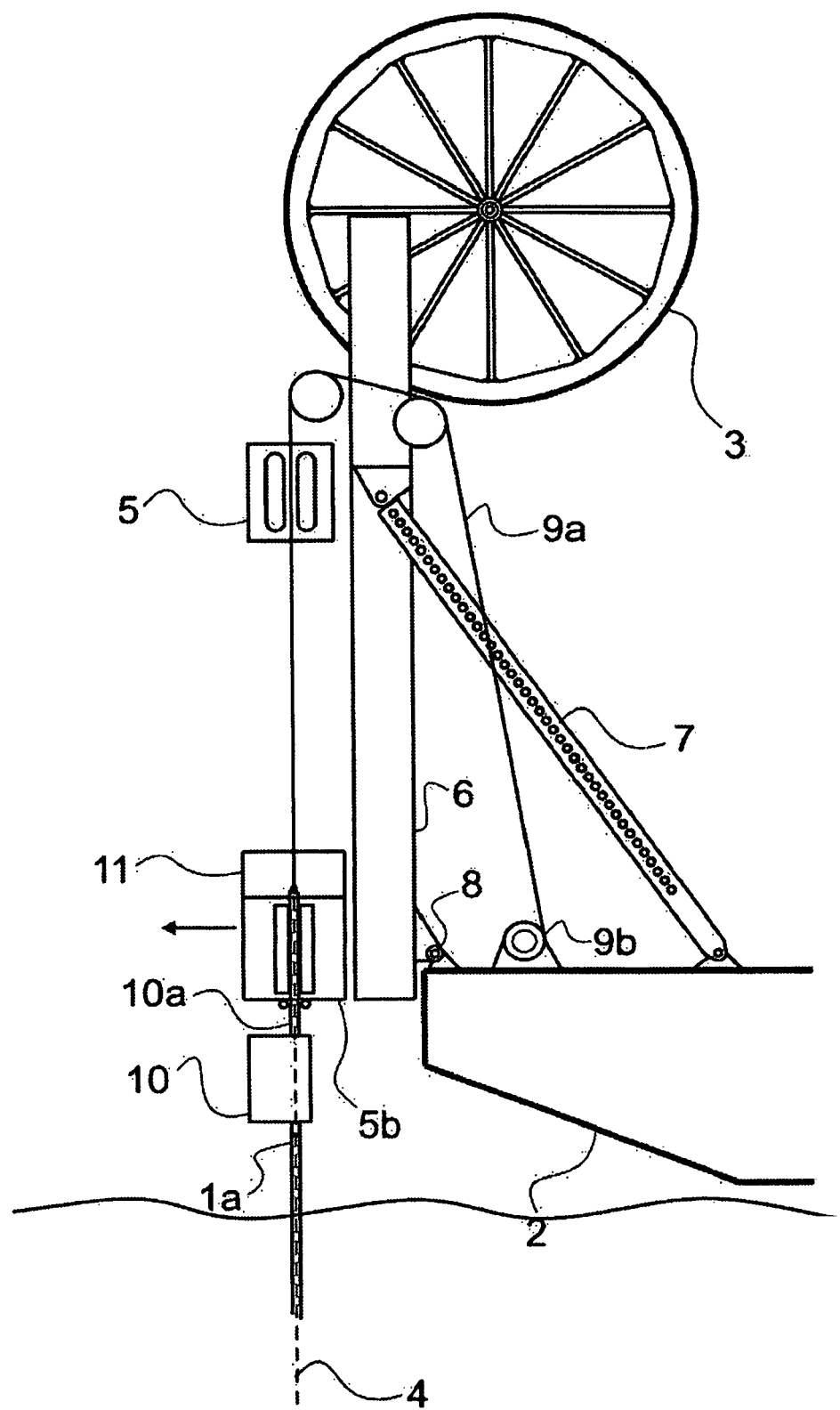
Figure 1H:
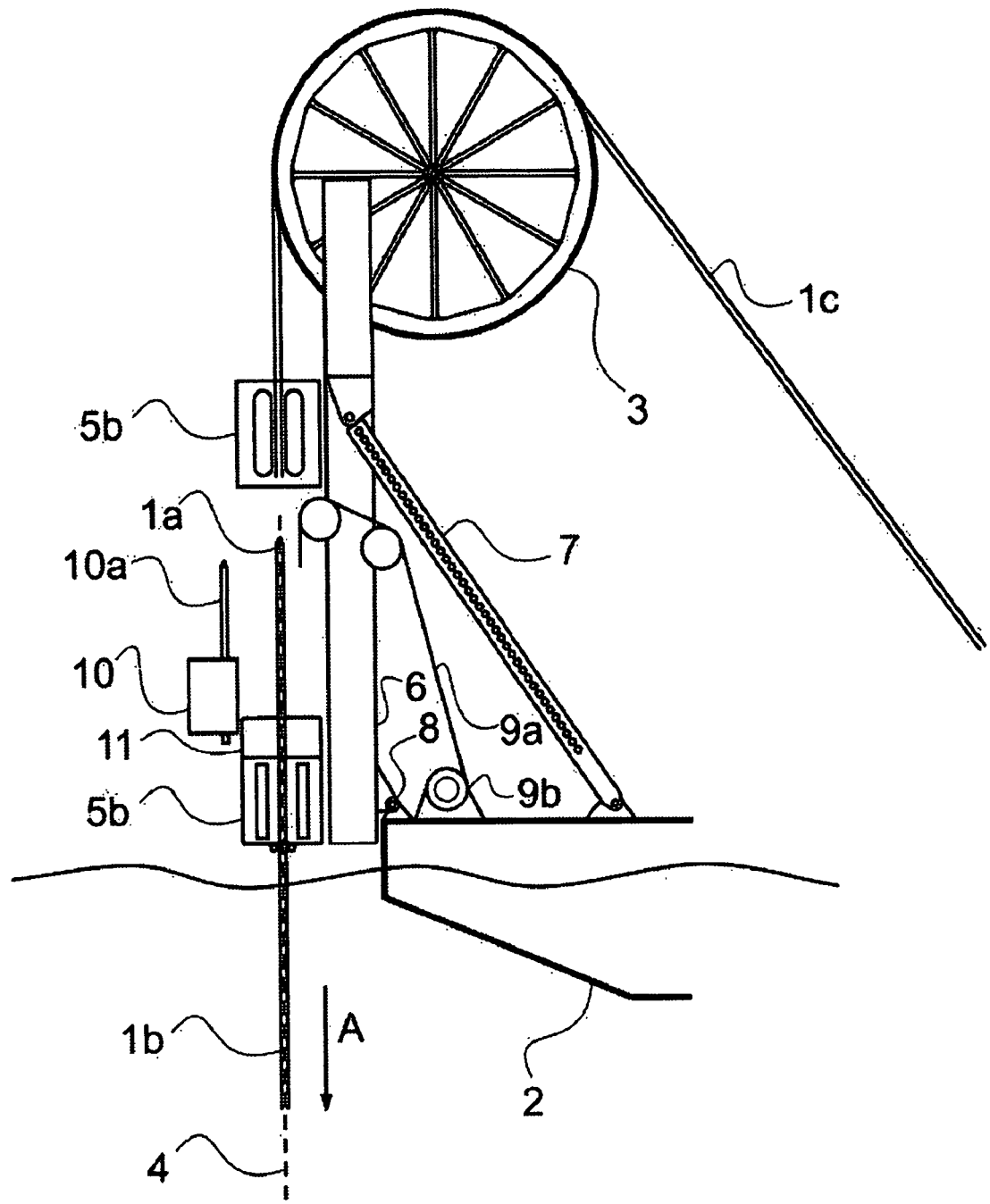

In FIG. 1g, the hang-off clamp 5b and the welding station 11 are moved back into the firing line 4. The hang-off clamp 5b can engage with the upper end 10a of the accessory 10. The weight of the accessory 10 and the launched pipeline 1b connected thereto is subsequently transferred from the A&R cable 9a to the hang-off clamp 5b while the accessory 10 and the launched pipeline 1b connected thereto remain in the firing line 4. The A&R cable 9a can be disconnected from the upper end 10a of the accessory 10, and it is possible to weld the pipeline from the reel to the upper end 10a of the accessory 10.

Figure 2A:
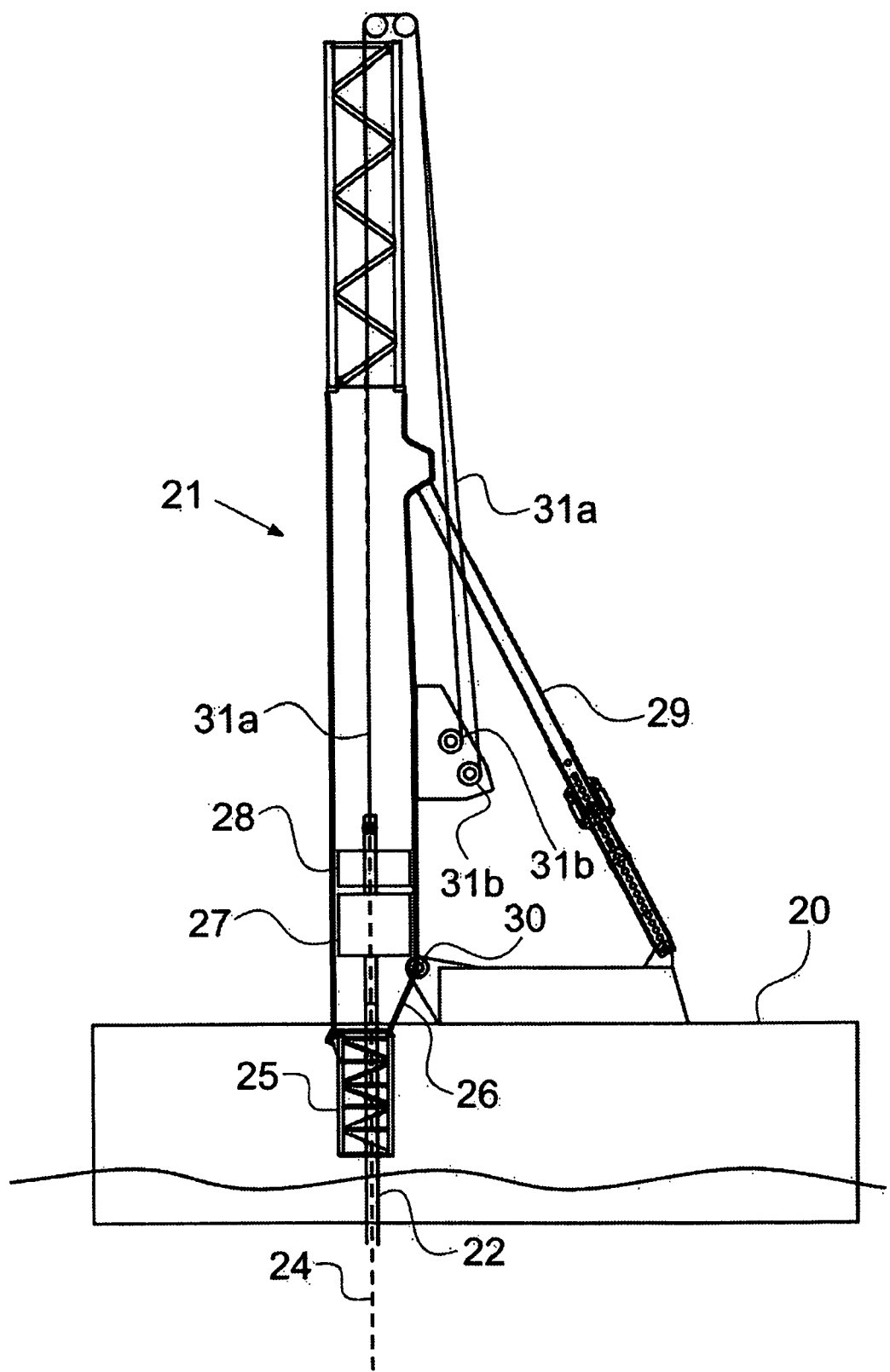
FIGS. 2a and 2b show a J-lay pipeline installation in which an accessory is introduced and lowered with the aid of a pipeline hoist cable suspended from the top of the tower.

FIG. 2a shows a J-lay tower 21 on a vessel 20. A pipeline 22 is launched in a firing line 24 from the vessel 20 in the direction of the seabed (not shown). The pipeline 22 is guided to the seabed in the firing line 24 through the tower 21, a hang-off clamp 27, and a stinger 25 at the lower end of the tower. The stinger 25 here is removable connected to the tower 21 by connecting means 26. The tower can be arranged at a side of the vessel, but alternatively the J-lay tower is near a moonpool, the moonpool large enough for an accessory to pass.

Figure 2B:
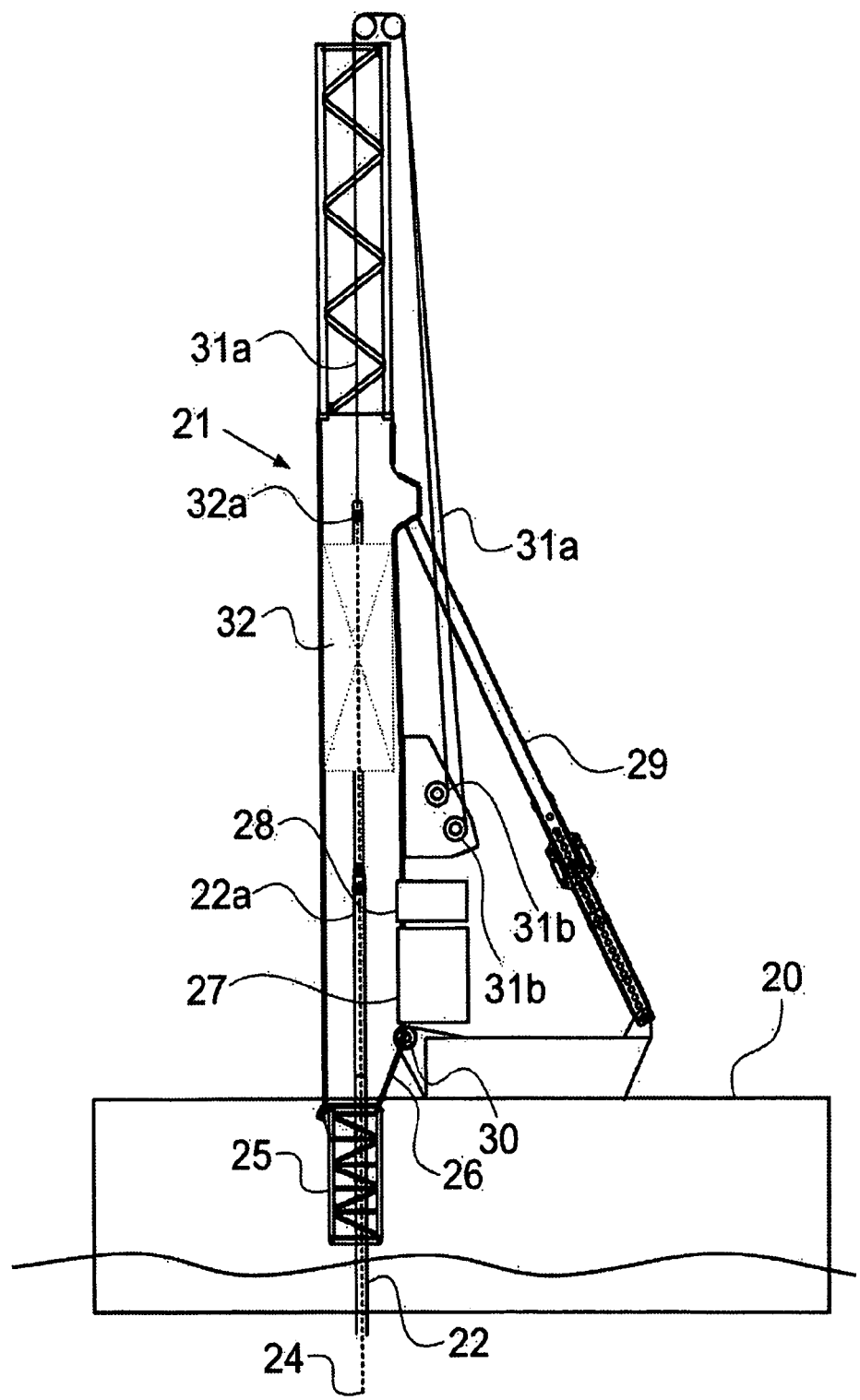

The clamp 27 is mounted in the tower 21 and can be moved away from the firing line 24 to a remote or inactive position shown in FIG. 2b. Alternatively the clamp 27 is connected directly to the vessel hull.

In the situation shown in FIG. 2a, the hang-off clamp 27 engages an upper part of the pipeline 22a and supports the weight of the previously launched pipeline 22.

In this example the tower 21 is connected pivotally to the vessel 20 about an essentially horizontal axis defined by hinge 30. One or more telescopic support struts 29 maintain the desired inclination of the tower 21.

Above the hang-off clamp 27, a welding station 28 is positioned, which is also removable from the firing line 24, e.g. by sliding its sideways.

A pipeline hoist cable 31a is connected to the upper part of the pipeline 22a. Winches 31b associated with the pipeline hoist cable 31a are mounted on the tower 21. The pipeline hoist cable 31a is guided from the winches 31b by sheaves 31c to the upper part of the pipeline 22a, while the cable 31a extends in the direction of the firing line 24.

FIG. 2b shows the same J-lay tower 21, but with an accessory 32 introduced into the pipeline 22. The accessory 32 has been moved into the tower 21 into the firing line 24 to a position above the hang-off clamp 27 and the upper end of the previously launched pipeline supported thereby. The accessory 32 is connected to the upper end of the pipeline 22a above the hang-off clamp 27 by welding in the welding station 28, while the pipeline 22 is held by the hang-off clamp 27.

In the situation shown in FIG. 2b, the pipeline 24 and the accessory are suspended from the cable 31a. Then the hang-off clamp 27 has been disengaged from the pipeline 22, and the welding station 28 and the hang-off clamp 27 have been moved away from the firing line 24. The accessory 32 and the launched pipeline 22 connected thereto are releasably secured to the pipeline hoist cable 31a in the tower 21 and are in the firing line 24. After removing or displacing, e.g. pivoting, the stinger 25 away from the firing line 24, it will be possible to lower the accessory 32 and the launched pipeline 22 connected thereto until the upper end 32a of the accessory can be clamped again by the hang-off clamp 27, when this clamp 27 is moved back into the firing line 24.

It is noted that in this configuration the tower may be provided with an pipe alignment tool above the hang-off clamp. It can be envisaged that this pipe alignment tool is also mounted in a moveable manner, so that the tool can be displaced in order to make room for the accessory 10.

Figure 3:
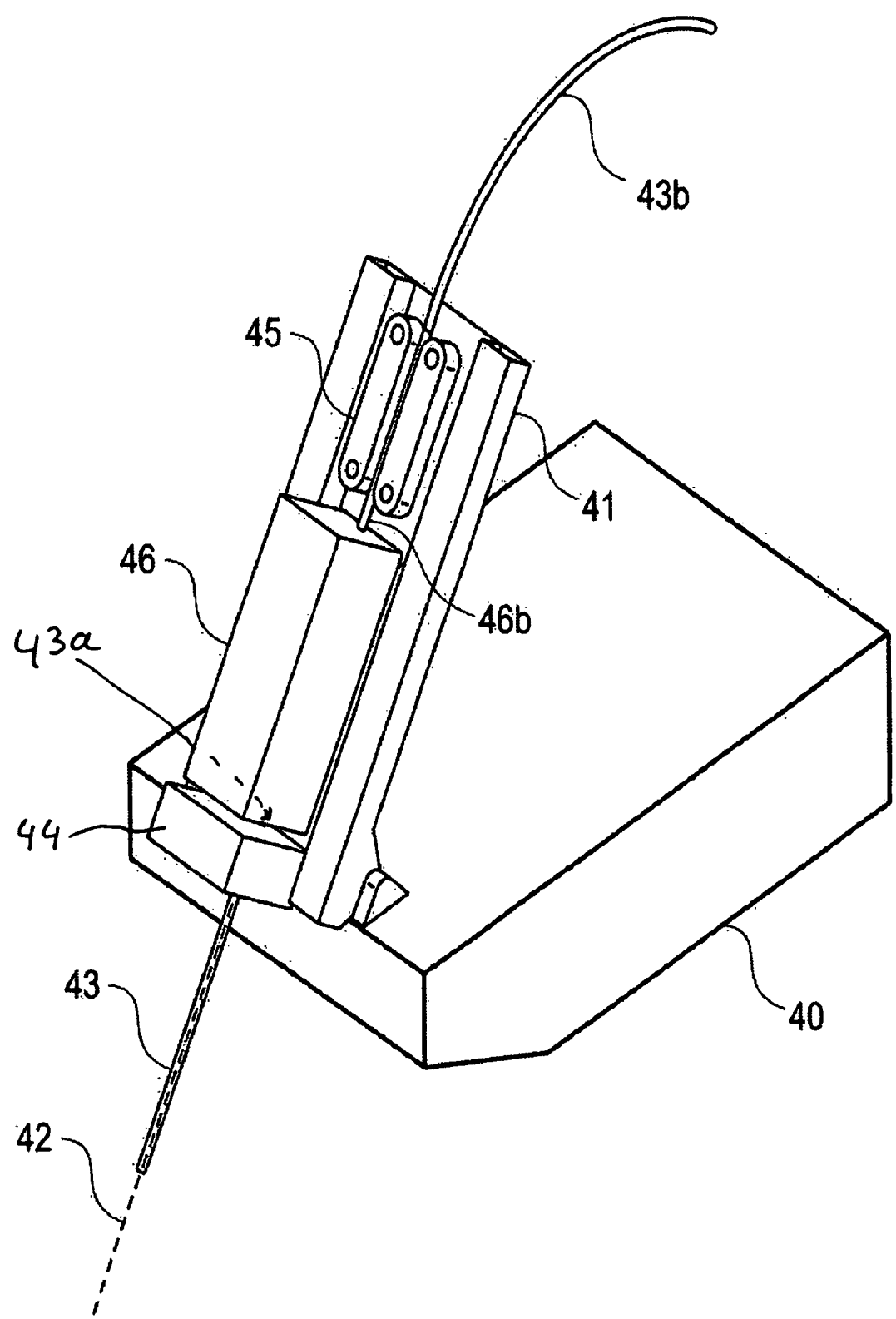
FIG. 3 shows part of a reel-lay pipeline installation in which an accessory is introduced and lowered with the aid of a tensioner and a pipeline.

FIG. 3 shows the launching part of a reel-lay pipeline installation. On the stern of a vessel 40 a ramp 41 is positioned along which a pipeline 43 is launched in the firing line 42 in the direction of the seabed (not shown). A clamp 44 and a tensioner 45 are connected to the ramp, respectively near the lower and upper end in this example. The pipeline 43 is being launched from the ramp 41 normally under control of the tensioner 45. In the inventive method the pipeline 43 is clamped by the clamp 45 and then interrupted, severed, above the clamp, thereby creating an upper pipe end 43a. The other pipe end 46b is moved upwards, or a section of pipe is removed all together, to provide a pipe end 46b just below the tensioner 45.

An accessory 46 is then introduced into the firing line 43 between the pipe ends 43a and 46b and then on one side connected to the upper pipe end 43a, while on the other end the accessory 46 is connected to the pipe end 46b. Hence, a pipeline with an intermediate accessory is formed between the clamp 44 and the tensioner 45. The weight of the pipeline 43 and accessory 46 can now be transferred to the tensioner 45, whereafter the clamp 44 is disengaged from the pipeline. In this unloaded state the clamp 44 can be moved far enough from the firing line 42, so that a passage is created to lower the accessory 46 with the aid of the tensioner 45 and the pipeline 43b. This is the situation shown in FIG. 3. After having lowered the accessory 46 far enough, the clamp 44 can be moved to the firing line to assist in the launch the rest of the pipeline, in particular is said clamp 44 is effectively construed as a tensioner having multiple endless belts with friction pads engaging on the pipeline, the speed of the belts being controlled by suitable speed control means.

Figure 4:
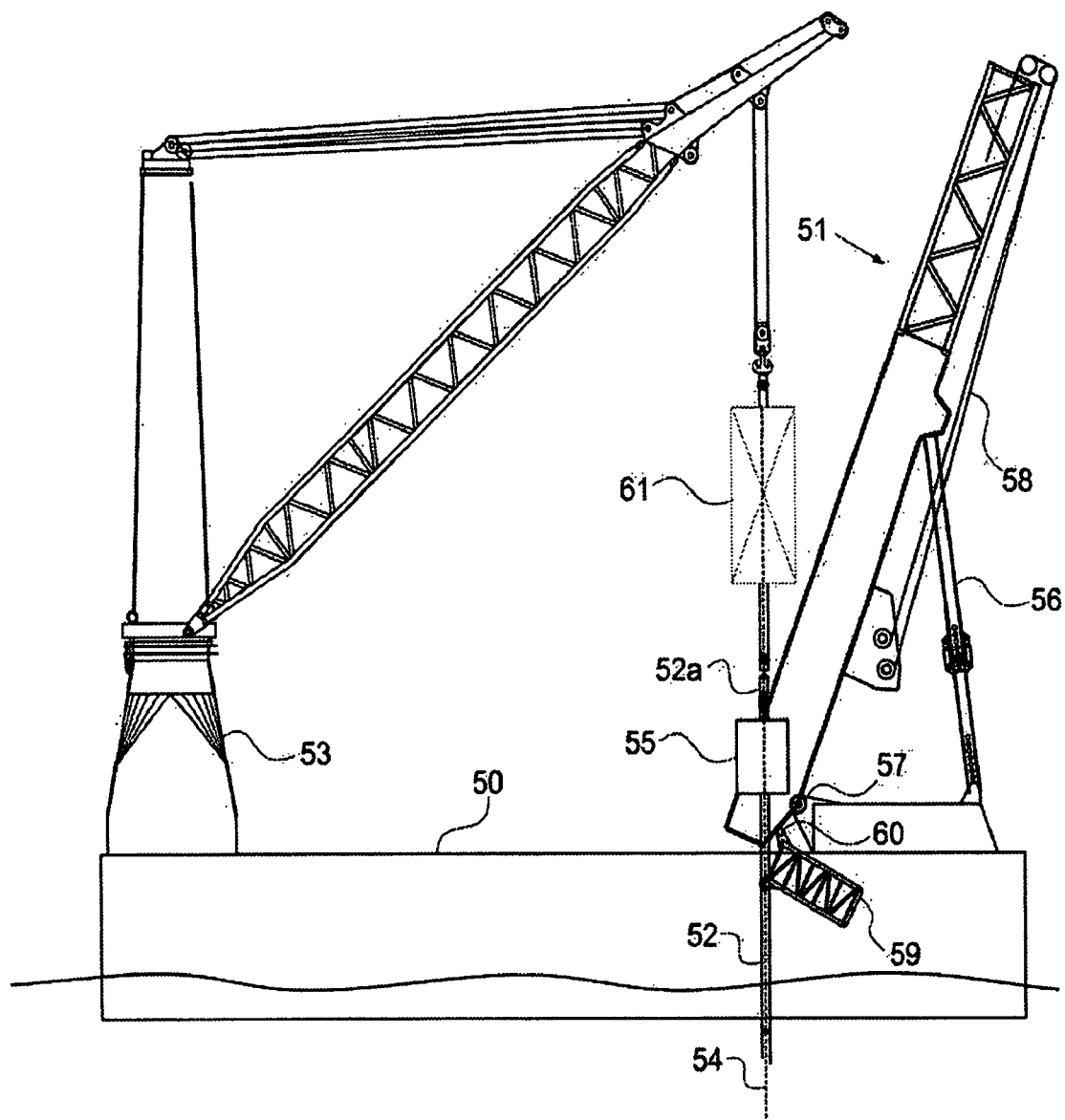
FIG. 4 shows a J-lay pipeline installation in which an accessory is introduced and lowered with the aid of a crane.

FIG. 4 shows a J-lay pipeline installation including a vessel 50, a tower 51, a pipeline 52 and a crane 53. The crane 53 is mounted on the vessel 50 at a location remote from the tower 51, e.g. having a boom which can be slewed about a vertical axis. In the alternative the crane 53 can be a mobile crane on the deck of the vessel 50 or a crane of an auxiliary vessel, e.g. moored alongside the vessel 50.

The pipeline 52 is launched to the seabed along a firing line 54, which in normal pipelaying operation extends through the structure of the tower 51 (not shown, but comparable to the situation shown in FIG. 2a). An upper part 52a of the pipeline 52 is engaged by a hang-off clamp 55.

The tower 51 is pivotable about pivot arrangement 57 with respect to the vessel 50. One or more telescopic struts or similar supports between the tower 51 and the vessel hull allow for the pivoting and support of the tower 51.

In the situation shown in FIG. 4, the tower 51 is pivoted away from the firing line 54 about the essentially horizontal pivot axis provided by arrangement 57. It is noted that the hang-off clamp 55 here is not pivoted along with the tower 51, but is still maintained in its position, thereby holding and supporting the launched pipeline 52 in the original firing line. The pivoting of the tower 51 is performed to such an inclination that the upper end 52a of the pipeline 52 becomes freely accessible from above for lowering an accessory on top of said upper end using the crane 53. In the non-pivoted away position of the tower, the tower would obstruct this vertical approach path to the upper end 52a for the accessory 61.

Maintaining the original position and orientation of the hang-off clamp 55—while pivoting the tower—is possible through providing a suitable support for the hang-off clamp 55.

A pipeline hoist cable 58 is suspended from the top of the tower 51 and was used to lower the pipeline until the upper part 52a of the pipeline 52 was engaged by a hang-off clamp 55, but is in the situation shown irrelevant.

A stinger 59 here is pivotally connected to the tower 51 by connecting means 60. The stinger 59 has been pivoted away from the firing line 54 in the shown situation.

An accessory 61 is introduced into the firing line 54 by a crane 53 having the crane hook positioned above the hang-off clamp 55. The accessory 61 can now be connected to the upper pipe end 52a and after removing the hang-off clamp 55 from the firing line the crane can lower the accessory 61 and the launched pipeline 52 connected thereto. When the accessory 61 is in a position below the stinger 59 and the clamp 55, the clamp 55 can move back into the firing line 54 and engage on the upper part of the accessory 61. Then the crane 53 can be disconnected from the accessory 61 and moved out of the firing line 54. Subsequently, the stinger 59 and the crane 51 can be moved back in the firing line 54, in order, for example, to continue J-lay pipe-laying.

In FIG. 5 schematically part of a J-lay tower is shown, comprising a tower 70, a pipeline 71 and a hang-off clamp 72.

FIG. 5a shows a pipeline 71 engaged by the hang-off clamp 72 in the tower 70. FIG. 5b shows the pipeline 71 and an accessory 73 connected thereto in a firing line 74, with the hang-off clamp 72 disengaged from the pipeline 71 and moved out of the firing line 74.

In the embodiment shown in FIG. 5a, the clamp 72 is connected to the tower 70 on three points. The tower comprises a connecting point 70a to which a connection bar 72a is connected. To remove the clamp 72 from the firing line 74, as shown in FIG. 5b, it is necessary to disconnect this connection bar 72a from the connecting point 70a. The tower further comprises a connection part 70b, to which the clamp 72 is pivotally connected. The clamp connection part 72b of the clamp 72 can be elongated hydraulically. Finally, the tower comprises a pivot point 70c, to which the clamp 72 is pivotally connected by pivot part 72c of the clamp 72.

So in order to remove the clamp from the firing line, it is pivoted to a remote or inactive position shown in FIG. 5b, which allows for the unobstructed lowering of the accessory past the clamp 72. As is shown the accessory has a tubular upper extension 73a, which is similar in dimensions to the pipeline and sufficiently long to bring the bulky part of the accessory far down, preferably to below the location of the stinger (which has also been moved away from the firing line). Then the clamp 72 can be returned to its position in FIG. 5a and engage beneath a collar fitted on said extension 73a.

Figure 6A:
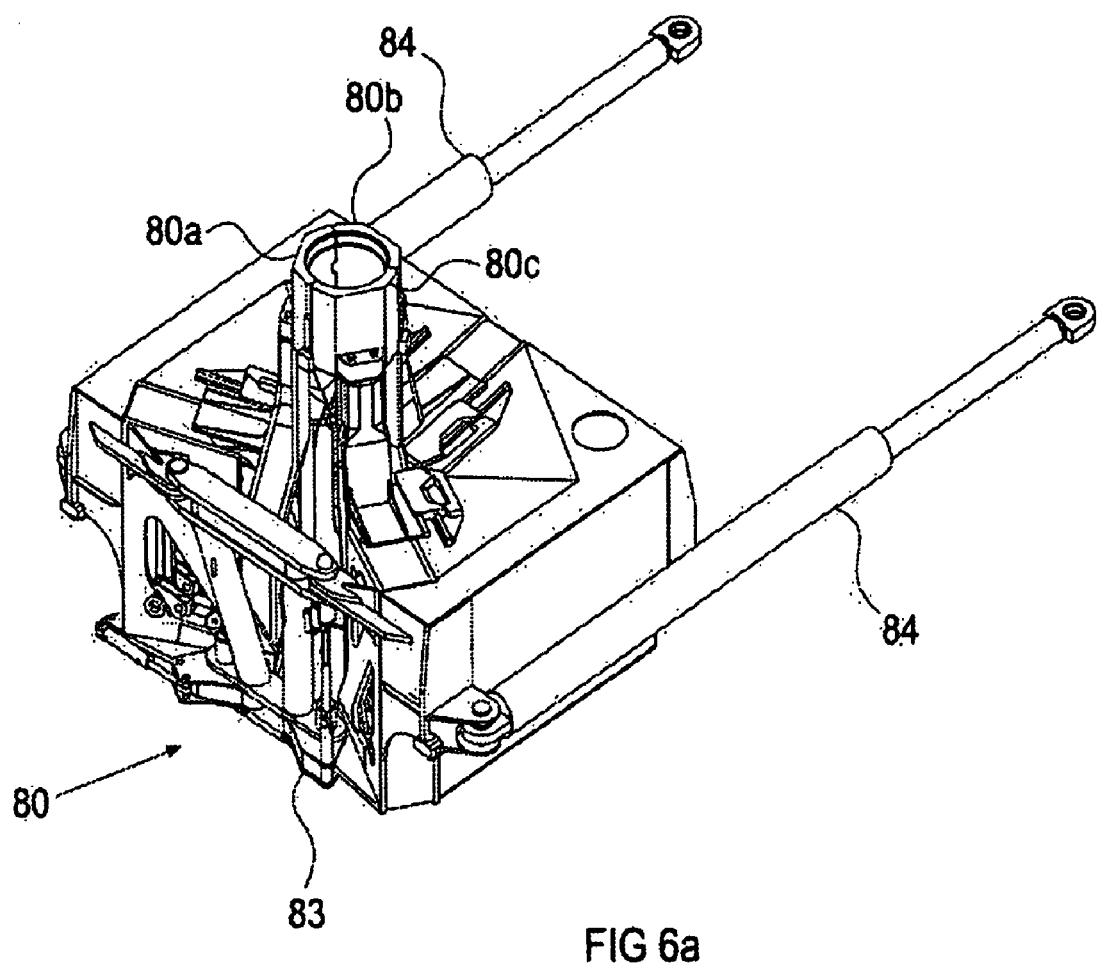
FIGS. 6a, 6b and 7 show and alternative example of a clamping device, removable from the firing line.
Figure 6B:
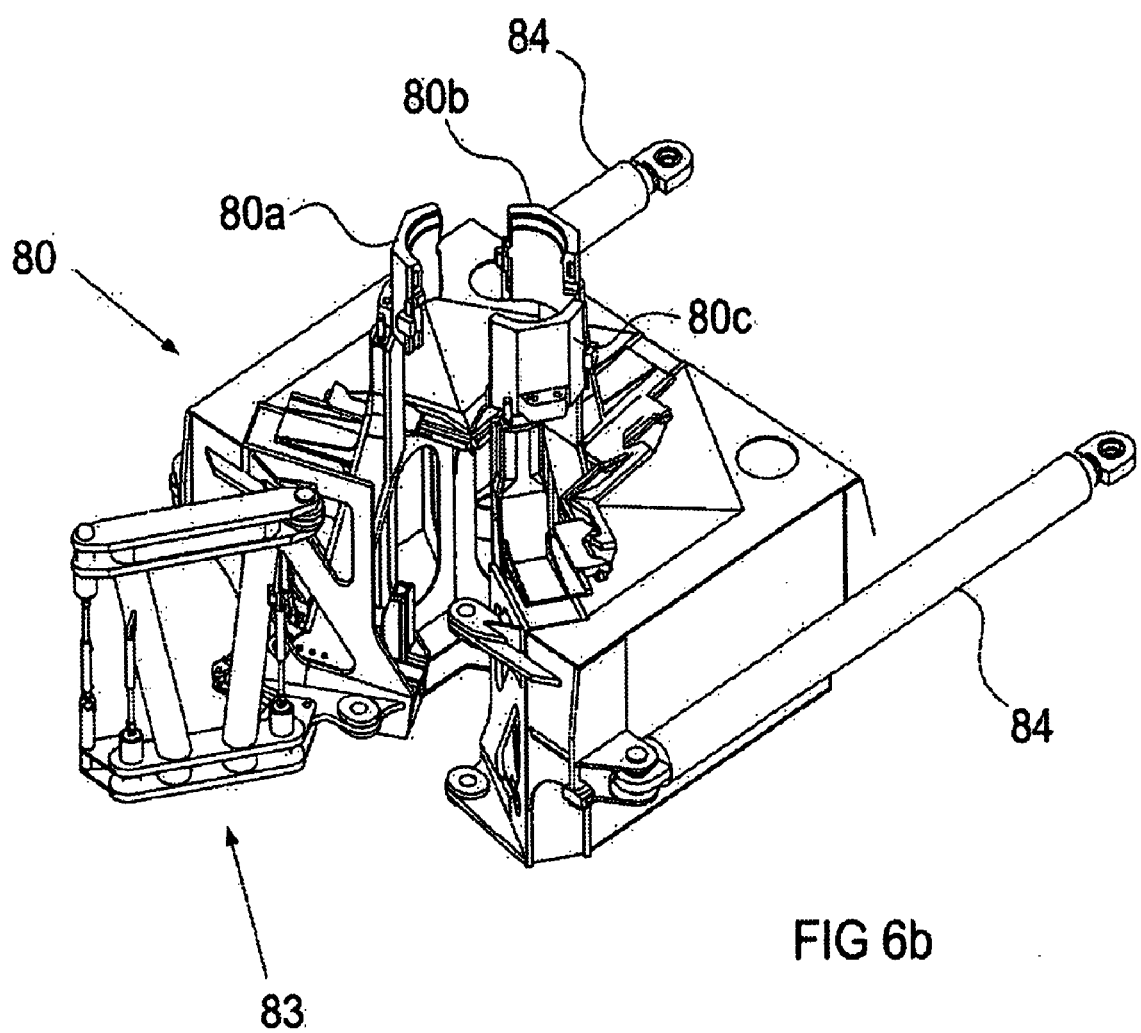
Figure 7:
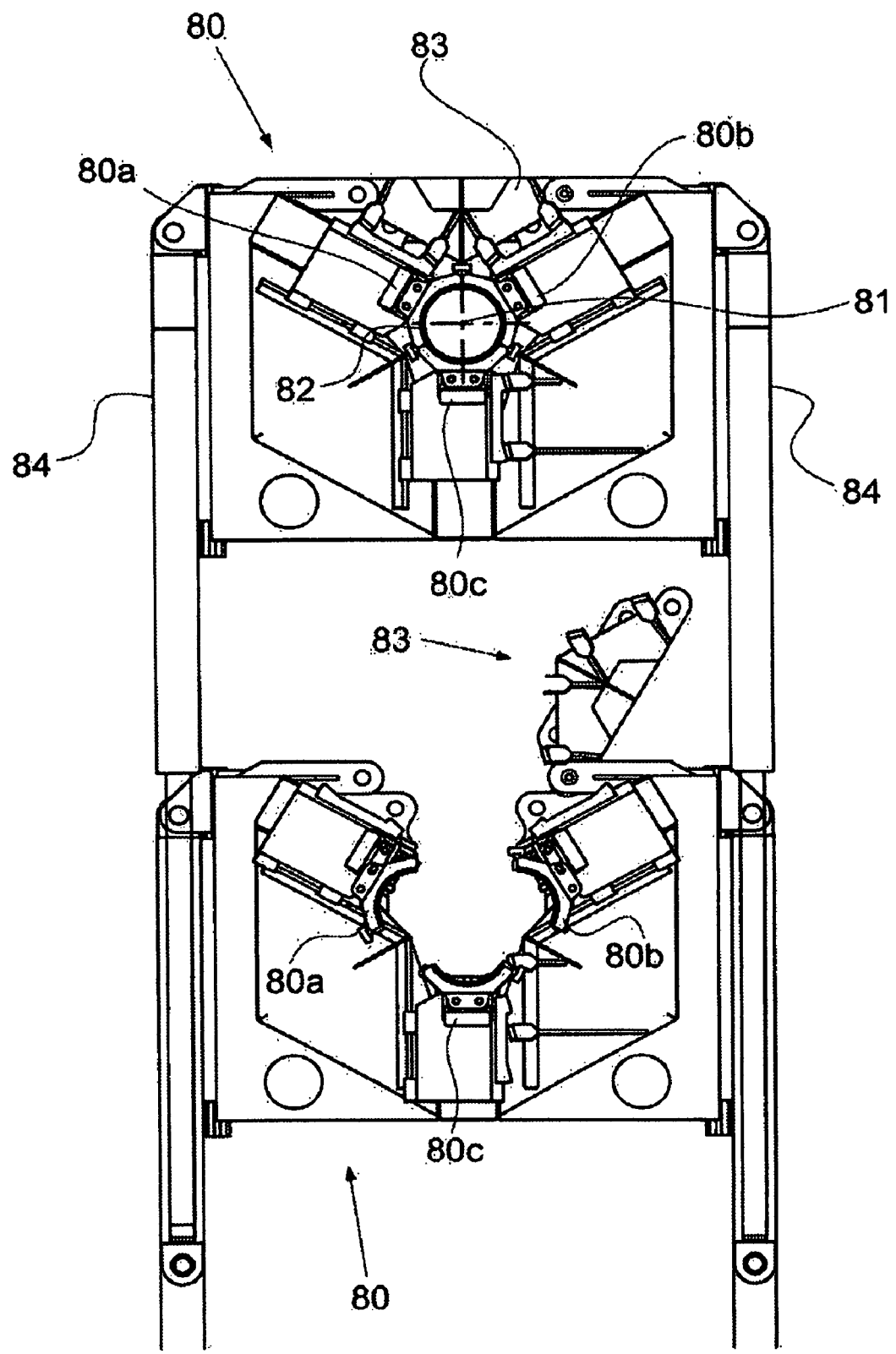

FIGS. 6a, 6b and 7 show an alternative example of a clamping device 80 for supporting the weight of a previously launched offshore pipeline. This clamping device 80 is movable away from a firing line of the associated pipeline launch device.

In FIG. 7, the clamping device 80 is shown in a plan view from above in two positions. In a perspective view FIG. 6a shows the clamp when in the position show above in FIG. 7, while the lower position of FIG. 7 is shown in a perspective view in FIG. 6b.

In the upper position of FIG. 7, the clamping device 80 is positioned while clamping and supporting the weight of a non-shown pipeline extending along the firing line 81.

In the lower position of FIG. 7, the clamping device 80 is positioned disengaged from a pipeline 82 and offset from firing line 81 to a remote, inactive position.

The clamping device 80 comprises a base structure, here essentially U-shaped, and multiple, here three, movable clamping jaws 80a, 80b and 80c mounted on said base structure, which jaws are in an open position in the lower position of FIG. 7.

The base structure of the clamping device 80 has a, e.g. hydraulically, operable door 83, which allows to bridge the open side of the U-shaped based and this creates an entrance/exit opening for the pipeline when the clamping device 80 is engaged with or removed from the pipeline to allow the clamping device, as indicated in FIG. 6b and the lower part of FIG. 7.

The clamping device 80 is mounted on a set of elongated bars 84, which bars 84 can translate the clamping device 80 in a horizontal motion between two positions: the positions indicated in FIGS. 6a, 6b and 7. Preferably the elongate bars 84 are hydraulically operated cylinders.

Figure 8:
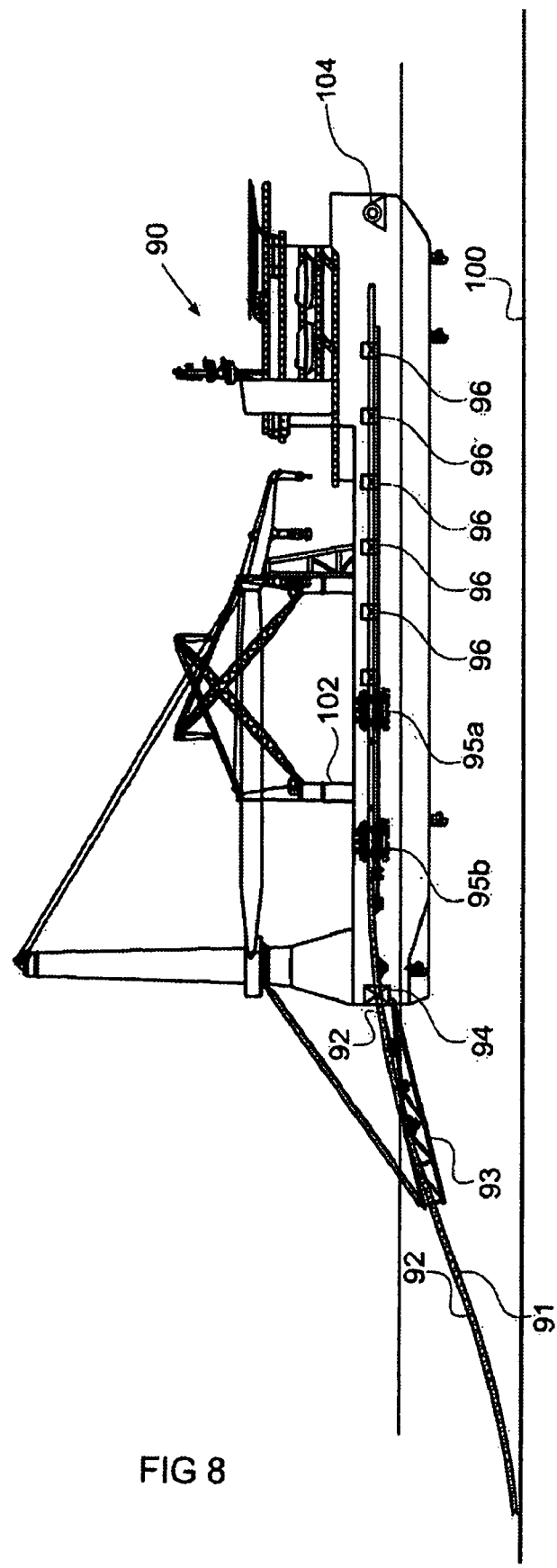
FIGS. 8, 9 and 10 show a S-lay pipeline installation in which an accessory is introduced and lowered with the aid of a crane.
Figure 9:
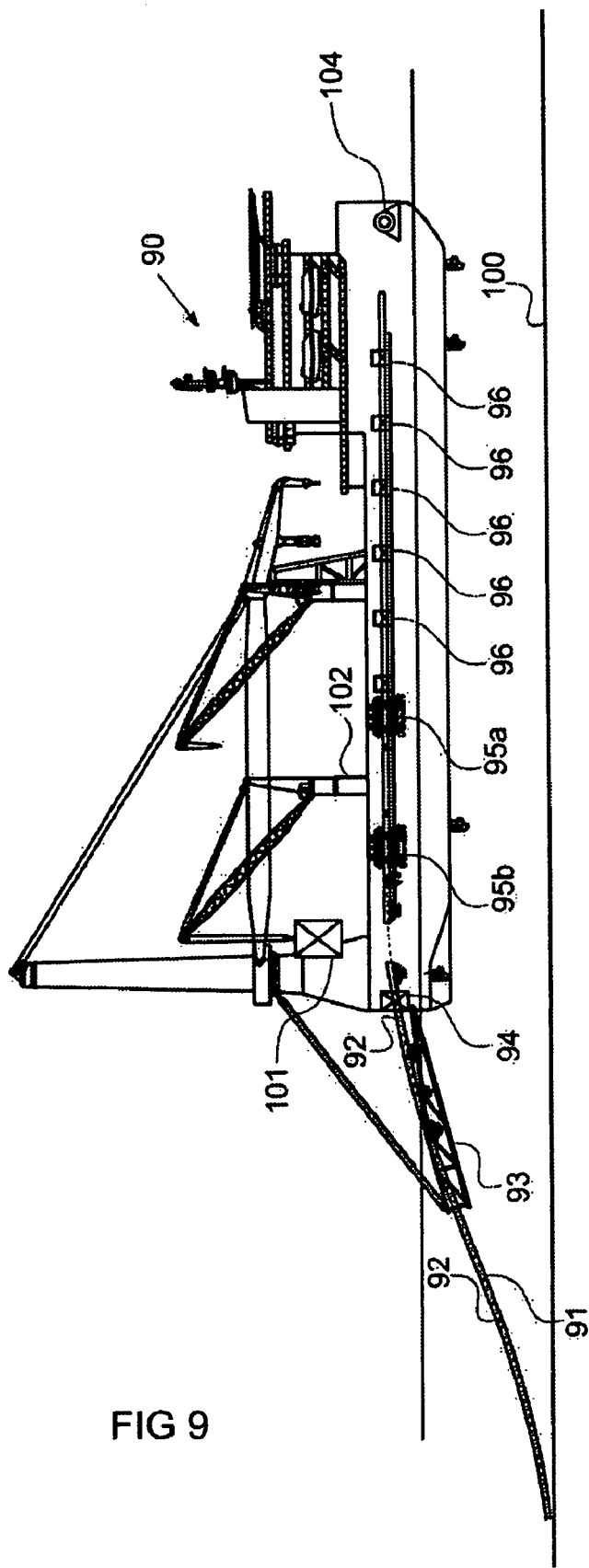
Figure 10:
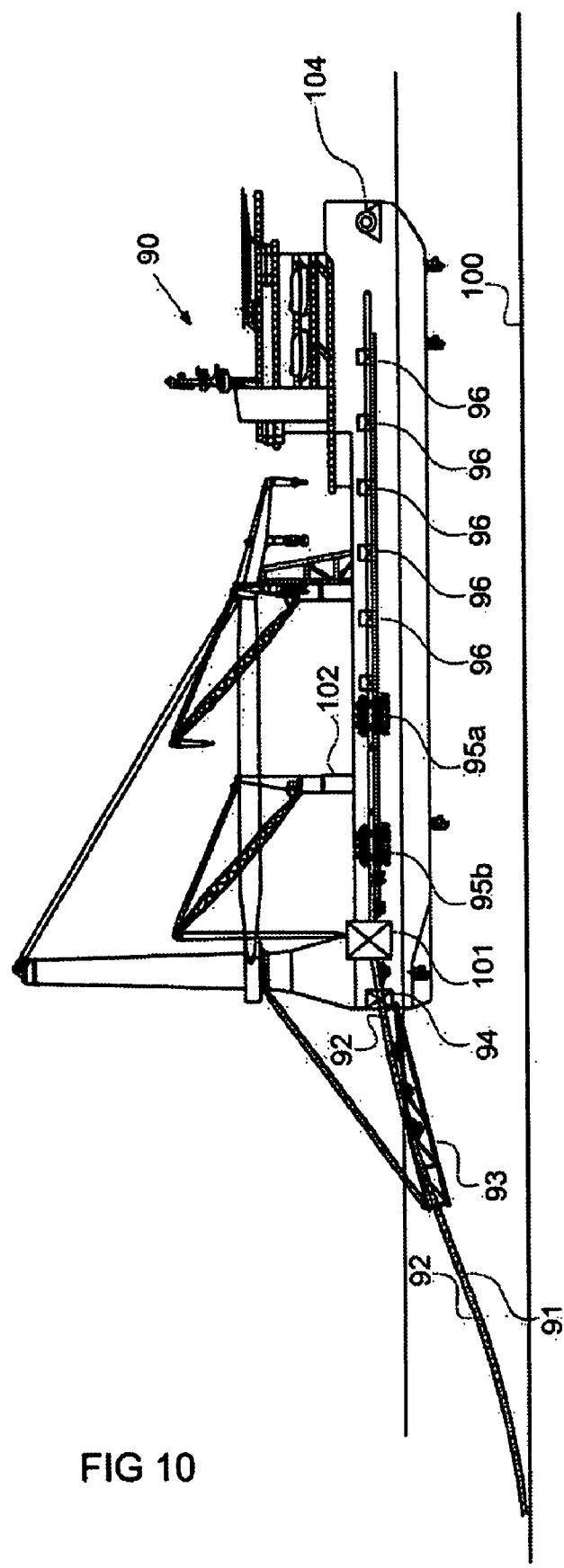

FIGS. 8 and 9 show a S-lay pipeline installation on an associated vessel 90. The pipeline 91 is launched in a firing line 92 in the direction of the seabed 100. After welding the pipeline in the one or more welding stations 96, the pipeline is passed through tensioners 95a and 95b and then passes through a clamp 94 to a stinger 93, from which the pipeline 91 is launched into the sea.

It is envisaged that the clamp 94 downstream of the tensioners is used to clamp the launched pipeline 91 and support the weight thereof, relieving said weight from the tensioners which normally support said weight.

Then it is proposed to sever the pipeline 91 between the clamp 94 and the neighbouring tensioner 95b and to move back the pipeline part engaged by the tensioners or to remove a section of the pipeline between the clamp and the neighbouring tensioner.

Then an accessory 101 is introduced into the firing line 92 between the clamp 94 and the last tensioner 95b, as is shown in FIG. 9.

Here the accessory is moved into the firing line 92 by a crane, e.g. crane 102 on the deck of the vessel. This could be a fixed mounted crane, even the tall crane at the stern of the vessel, but also a mobile crane on the deck of the crane of an auxiliary vessel.

Upstream of the clamp 94 the accessory 101 is connected to the pipeline 91. Suitable positioning of the accessory can be carried out with the crane or specialised positioning tools arranged here in the vessel.

The accessory 101 is also connected to the other end of the pipeline still held in the tensioners. Now the weight of the launched pipeline can be transferred back to the tensioners and the clamp 94 can be disengaged from the pipeline 91.

The clamp 94 is then preferably moved away, e.g. sideways, in order to make room for the accessory to pass.

If said accessory is an end terminal to be fitted on the pipeline, it is proposed to use the A&R winch 104 and associated A&R cable to attach to the accessory fitted on the pipeline end and then lower the pipeline and accessory to the seabed using the A&R winch.

Figure 11:
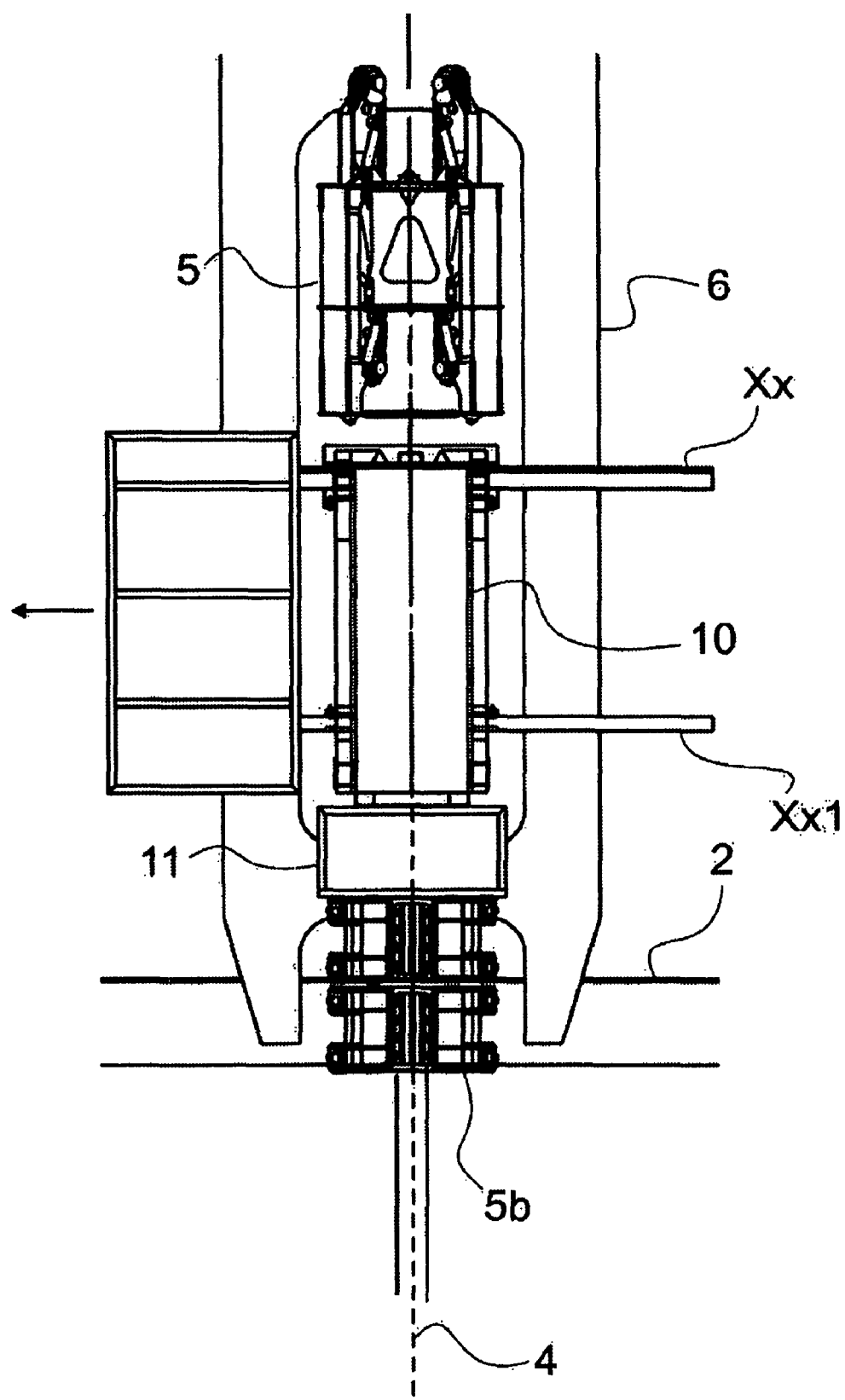
FIGS. 11, 12 and 13 show a preferred embodiment of a pipe launch device of the present invention.
Figure 12:
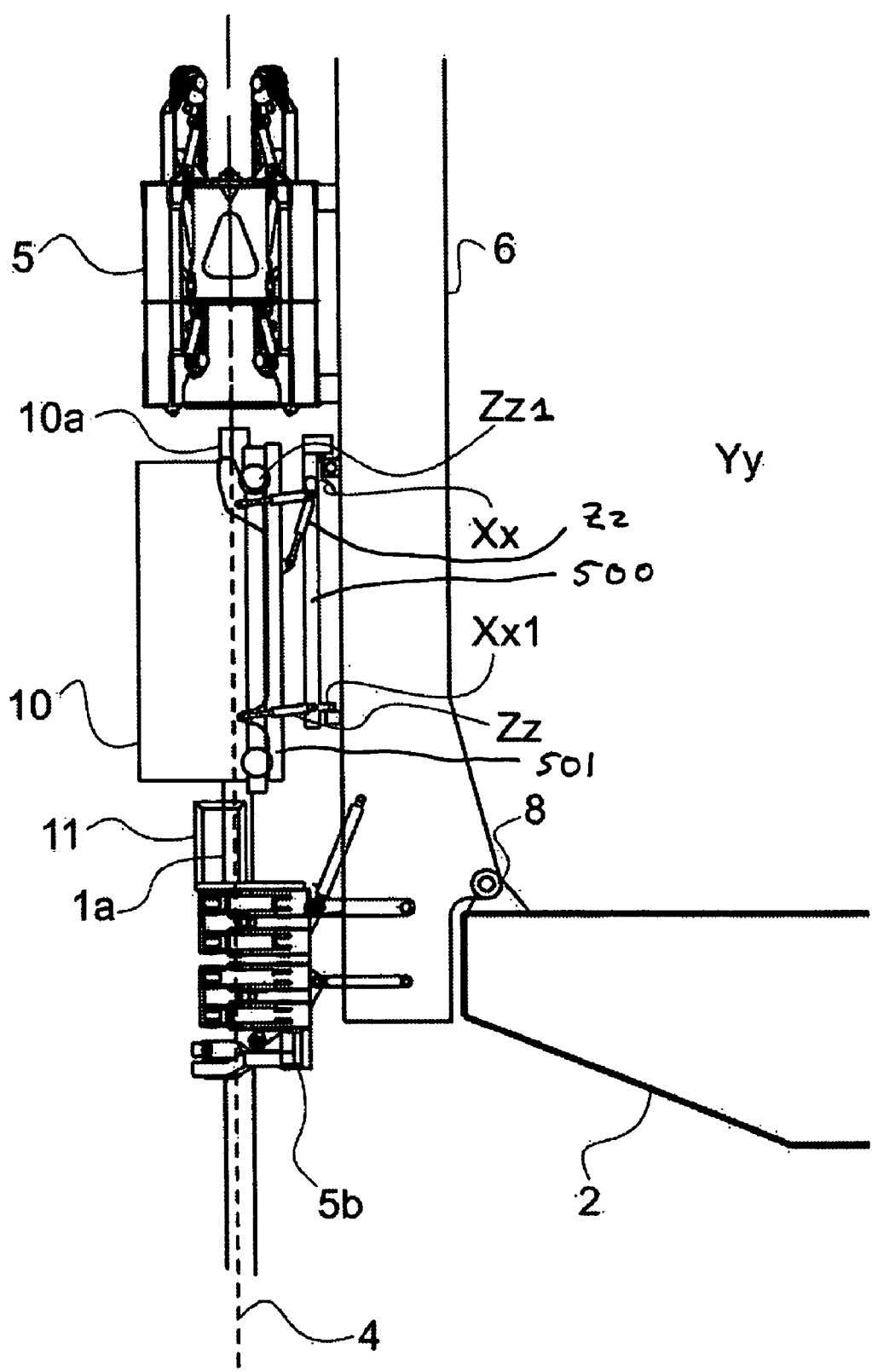
Figure 13:
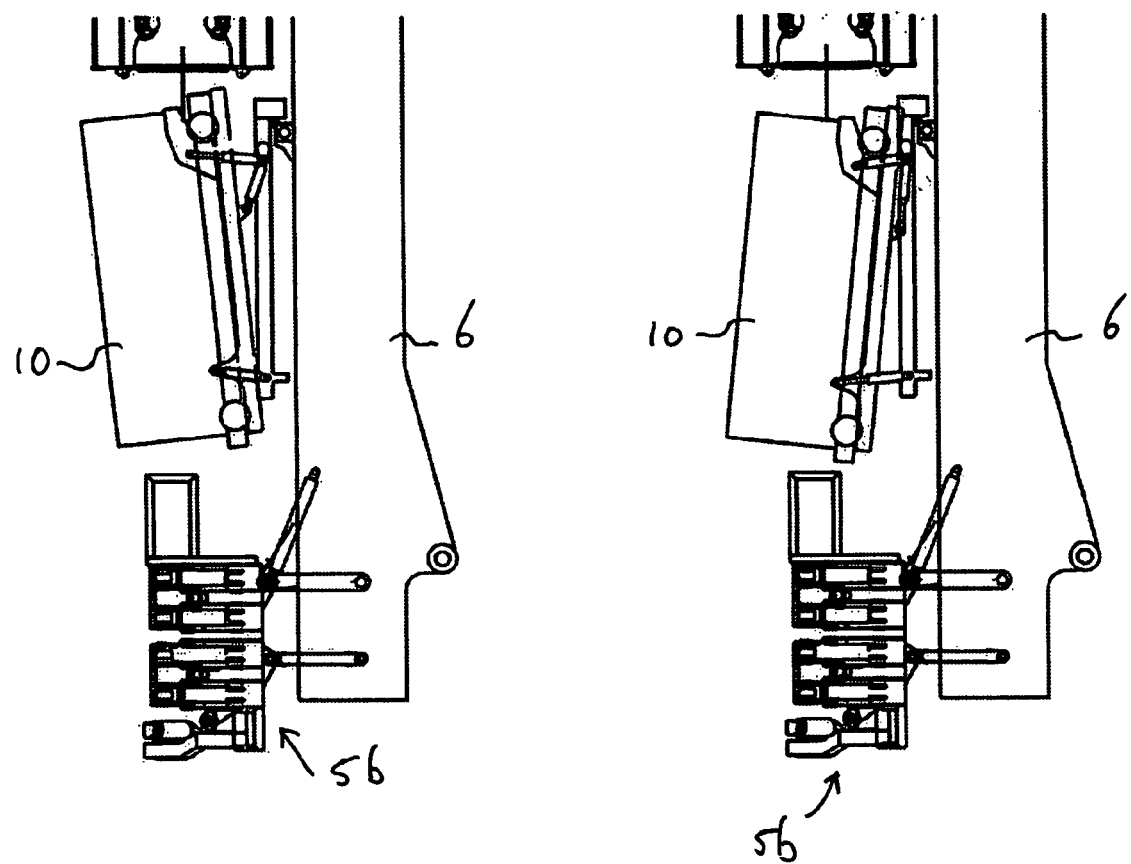

FIGS. 11-13 show in more detail a preferred embodiment of the reel lay tower 6 discussed with reference to FIGS. 1a-g.

In FIG. 11 it can be seen that accessory guide means, here including horizontal rails Xx, Xx1 are provided on the tower 6 to slide the accessory 10 between a storage position (away from the firing line 4) and a connection position in the firing line 4. In fact also an accessory positioning means is provided for holding and accurately positioning the accessory 10 with respect to the upper pipeline end 1a.

In this example a subframe 500 is supported by the rails Xx, Xx1. A second subframe 501 is mounted movable on said first subframe 500. Actuators, here hydraulic cylinders Zz allow to orient the second subframe in a desired orientation. E.g. the actuators Zz provide for multiple degrees of motion, e.g. six axis to obtain full spatial control of the position of the accessory 10.

The accessory 10 is mounted releasably on the subframe 501, e.g. by the accessory 10 having supports Zz1 engaging in hooks provided on the subframe 502.

As the FIG. 13 shows the actuators provide accurate positioning of the accessory 10.

In a far simpler configuration it is envisaged that the accessory positioning means merely comprise hooks, e.g. fastened on the tower, and the accessory having mating supports, so that these supports are lowered into the hooks and then the accessory is rotated to its intended position.

In all it is envisaged that for handling and positioning the accessory 10 specialised means are employed, which prevents accidents, increases efficiency, and improves the quality of the connection between the accessory and the pipeline.

It is noted that such specialised means can also be used in combination with the J-lay and S-lay techniques described herein.

The present invention also relates to a clamping device as disclosed herein adapted for supporting a launched offshore pipeline. Also the invention relates to a launch device, e.g. a J-lay tower or Reel lay tower, or S-lay installation, as disclosed herein.

The invention claimed is:

1. A marine pipelaying system for installing an offshore pipeline that includes one or more accessories, the system comprising;
    a vessel;
    a pipeline launch device for launching the pipeline in a firing line from the vessel in the direction of the seabed;
    a clamping device that is connected to the vessel and adapted to support the weight of the previously launched pipeline, which clamping device engages the pipeline in the firing line;
    accessory connecting means for connecting the one or more accessories to the pipeline while the pipeline is in the clamping device in the firing line;
    accessory displacement means comprising horizontal rails located above the clamping device and provided on the pipeline launch device to slide the one or more accessories relative to the clamping device and approximately horizontally perpendicular to the firing line between a storage position for receiving the one or more accessories and a connection position in the firing line above the clamping device for connecting the one or more accessories to the previously launched pipeline while the clamping device supports the previously launched pipeline in the firing line; and
    a controlled load hoisting device that can releasably be secured to the one or more accessories and the launched pipeline connected thereto and can lower the one or more accessories and the launched pipeline connected thereto in the firing line.

2. The system according to claim 1, wherein the pipeline launch device comprises a S-lay system.

3. The system according to claim 1, wherein the pipeline launch device comprises a J-lay system.

4. The system according to claim 1, wherein the pipeline launch device comprises a reel-lay system.

5. The system according to claim 1, wherein the controlled load hoisting device comprises an abandonment and recovery line (A&R) system, comprising an A&R winch and an A&R cable.

6. The system according to claim 1, wherein the controlled load hoisting device comprises a crane, mounted on the vessel.

7. The system according to claim 1, wherein the pipeline launch device comprises a tower mounted on the vessel.

8. The system according to claim 7, which tower is pivotable away from the firing line, while remaining the clamping device in the firing line, in order to introduce the one or more accessories in the firing line.

9. The system according to claim 7, wherein the controlled load hoisting device comprises a pipeline hoist cable suspended from the tower.

10. The system according to claim 1, comprising a tensioner positioned in the firing line above the clamping device, which tensioner acts as a controlled load hoisting device.

11. The system according to claim 1, wherein the vessel is a dynamically positioned vessel.

12. The system according to claim 1, wherein the clamping device comprises hydraulic means.

13. The system according to claim 1, wherein the clamping device comprises a hang-off clamp.

14. The system according to claim 1, wherein the clamping device comprises a tensioner.

15. The system according to claim 1, wherein the accessory connecting means comprises welding means.

16. The system according to claim 1, in which the accessory displacement means further comprises accessory positioning means for holding and accurately positioning the one or more accessories with respect to the upper pipeline end.

17. The system according to claim 16, in which the accessory positioning means comprises a subframe supported by rails and a second subframe mounted movable on said first subframe, in which the one or more accessories is mounted releasably on the second subframe, and further comprising actuators allowing the second subframe to be oriented in a desired orientation.

18. The system according to claim 17, in which the actuators provide for six axes of motion to obtain full spatial control of the position of the accessory.

19. The system according to claim 16, in which the one or more accessories positioning means comprises hooks and the one or more accessories having mating supports, so that these supports are lowered into the hooks and then the accessory is rotated to its intended position.

20. The system according to claim 1, wherein the clamping device translates horizontally between the firing line and a remote position.

21. The system according to claim 1, wherein the clamping device is moved to and from the firing line across a rail.

22. The system according to claim 1, wherein the clamping device is rotatable to and from the firing line by rotation means.

* * * * *